US012621836B2

(12) United States Patent
Kim et al.

(10) Patent No.: US 12,621,836 B2
(45) Date of Patent: May 5, 2026

(54) METHOD AND DEVICE FOR TRANSMITTING AND RECEIVING SIGNAL IN WIRELESS COMMUNICATION SYSTEM

(71) Applicant: Samsung Electronics Co., Ltd., Gyeonggi-do (KR)

(72) Inventors: Youngbum Kim, Gyeonggi-do (KR); Taehyoung Kim, Gyeonggi-do (KR); Hyunseok Ryu, Gyeonggi-do (KR); Jinyoung Oh, Gyeonggi-do (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 479 days.

(21) Appl. No.: 17/928,825

(22) PCT Filed: Apr. 29, 2021

(86) PCT No.: PCT/KR2021/005471
§ 371 (c)(1),
(2) Date: Nov. 30, 2022

(87) PCT Pub. No.: WO2021/246653
PCT Pub. Date: Dec. 9, 2021

(65) Prior Publication Data
US 2023/0217452 A1 Jul. 6, 2023

(30) Foreign Application Priority Data

Jun. 2, 2020 (KR) ........................ 10-2020-0066695
Jul. 22, 2020 (KR) ........................ 10-2020-0091279
Oct. 22, 2020 (KR) ........................ 10-2020-0137762

(51) Int. Cl.
*H04W 72/23* (2023.01)
(52) U.S. Cl.
CPC ................................. *H04W 72/23* (2023.01)

(58) Field of Classification Search
CPC ..................................................... H04W 72/23
See application file for complete search history.

(56) References Cited

U.S. PATENT DOCUMENTS 9,628,237 B2 4/2017 Kim et al.
9,667,399 B2 5/2017 Lee et al.
(Continued)

FOREIGN PATENT DOCUMENTS

CN 102668669 9/2012
CN 110662228 1/2020
(Continued)

OTHER PUBLICATIONS

PCT/ISA/210, International Search Report dated Aug. 12, 2021 issued in counterpart application No. PCT/KR2021/005471, 5 pages.
(Continued)

*Primary Examiner* — Jael M Ulysse
(74) *Attorney, Agent, or Firm* — The Farrell Law Firm, P.C.

(57) ABSTRACT

The present disclosure relates to a method and device for transmitting and receiving a signal in a wireless communication system, and an operation method of a user equipment (UE) in the wireless communication system may include receiving, from a base station, configuration information related to carrier aggregation (CA), wherein the configuration information related to the CA includes information related to cross-carrier scheduling between a primary cell (PCell) and a secondary cell (SCell), performing configuration related to the CA, based on the configuration information related to the CA, monitoring a common search space (CSS) of the PCell on the PCell and monitoring a UE-specific search space (USS) of the SCell on the SCell,
(Continued)

based on the performed configuration related to the CA, and receiving a physical downlink control channel (PDCCH), based on the monitoring.

13 Claims, 27 Drawing Sheets

(56) References Cited

U.S. PATENT DOCUMENTS

| | | | |
|---|---|---|---|
| 9,674,843 B2 | 6/2017 | Lee et al. | |
| 9,887,828 B2 | 2/2018 | Pelletier et al. | |
| 10,116,422 B2 | 10/2018 | Chen et al. | |
| 10,313,071 B2 | 6/2019 | Lee et al. | |
| 2011/0134774 A1* | 6/2011 | Pelletier | H04W 76/15 |
| | | | 370/242 |
| 2011/0267978 A1* | 11/2011 | Etemad | H04L 5/0016 |
| | | | 370/254 |
| 2011/0310818 A1* | 12/2011 | Lin | H04L 5/0048 |
| | | | 370/328 |
| 2013/0044653 A1* | 2/2013 | Yang | H04W 72/21 |
| | | | 370/280 |
| 2013/0136006 A1* | 5/2013 | Kim | H04L 5/0098 |
| | | | 370/329 |
| 2013/0188618 A1* | 7/2013 | Dinan | H04W 48/00 |
| | | | 370/336 |
| 2014/0022967 A1* | 1/2014 | Yang | H04L 5/0055 |
| | | | 370/280 |
| 2014/0169323 A1* | 6/2014 | Park | H04W 74/085 |
| | | | 370/329 |
| 2014/0198748 A1* | 7/2014 | Lee | H04L 5/0094 |
| | | | 370/329 |
| 2015/0103705 A1* | 4/2015 | Yang | H04L 27/2626 |
| | | | 370/280 |
| 2015/0117287 A1* | 4/2015 | Kim | H04W 56/0045 |
| | | | 370/311 |
| 2015/0304086 A1* | 10/2015 | Kim | H04L 5/0098 |
| | | | 370/329 |
| 2016/0081111 A1* | 3/2016 | Yi | H04L 5/001 |
| | | | 370/336 |
| 2016/0227486 A1* | 8/2016 | Park | H04W 72/21 |
| 2016/0242151 A1* | 8/2016 | Seo | H04W 76/10 |
| 2016/0373233 A1 | 12/2016 | Pelletier et al. | |
| 2017/0135127 A1* | 5/2017 | Nogami | H04W 72/23 |
| 2017/0170941 A1* | 6/2017 | Yang | H04W 24/10 |
| 2017/0208588 A1* | 7/2017 | Park | H04L 5/001 |
| 2018/0042043 A1* | 2/2018 | Babaei | H04W 72/20 |
| 2018/0077644 A1* | 3/2018 | Dinan | H04W 76/27 |
| 2018/0098266 A1* | 4/2018 | Futaki | H04W 72/04 |
| 2019/0246417 A1* | 8/2019 | Dinan | H04W 72/52 |
| 2019/0357238 A1* | 11/2019 | Zhou | H04W 72/23 |
| 2020/0100262 A1* | 3/2020 | Dinan | H04W 72/121 |
| 2020/0136790 A1* | 4/2020 | Takeda | H04L 27/2602 |
| 2021/0112585 A1 | 4/2021 | Ji et al. | |
| 2023/0026760 A1* | 1/2023 | Takeda | H04W 24/08 |
| 2023/0156700 A1* | 5/2023 | Liu | H04W 24/08 |
| | | | 370/329 |
| 2024/0237015 A1 | 7/2024 | Ji et al. | |

FOREIGN PATENT DOCUMENTS

| | | |
|---|---|---|
| EP | 3 451 553 | 3/2019 |
| KR | 10-2015-0082222 | 7/2015 |
| WO | WO 2013/009068 | 1/2013 |
| WO | WO 2014/062041 | 4/2014 |
| WO | WO 2016/048111 | 3/2016 |
| WO | WO 2020/001225 | 1/2020 |

OTHER PUBLICATIONS

PCT/ISA/237, Written Opinion dated Aug. 12, 2021 issued in counterpart application No. PCT/KR2021/005471, 4 pages.
Chinese Office Action dated Mar. 14, 2025 issued in counterpart application No. 202180040023.3, 17 pages.
Texas Instruments, "Search Space Monitoring for RA Procedure on a SCell", R1-120461, 3GPP TSG RAN WG1 #68, Feb. 6-10, 2012, 3 pages.
Chinese Office Action dated Aug. 21, 2025 issued in counterpart application No. 202180040023.3, 4 pages.
Korean Office Action dated Jan. 21, 2026 issued in counterpart application No. 10-2020-0137762, 12 pages.

* cited by examiner $\mu = 2$ 14 symbols
(0.25ms slot)

12 subcarriers
(720kHz)

60kHz

T/4 frequency time

FIG. 22

METHOD AND DEVICE FOR TRANSMITTING AND RECEIVING SIGNAL IN WIRELESS COMMUNICATION SYSTEM

PRIORITY

This application is a National Phase Entry of PCT International Application No. PCT/KR2021/005471, which was filed on Apr. 29, 2021, and claims priority to Korean Patent Application Nos. 10-2020-0066695, 10-2020-0091279, and 10-2020-0137762, which were filed on Jun. 2, 2020, Jul. 22, 2020, and Oct. 22, 2020, respectively, the entire content of each of which is incorporated herein by reference.

TECHNICAL FIELD

The present disclosure relates to a method and device for transmitting and receiving a signal in a wireless communication system.

BACKGROUND ART

Efforts have been made to develop an improved 5th generation (5G) communication system or pre-5G communication system to keep up with growing wireless data traffic demand after the commercialization of 4th generation (4G) communication systems. For this reason, the 5G or pre-5G communication system is called a beyond 4G network communication system or a post long-term evolution (LTE) system. Implementation of 5G communication systems in an ultra-high frequency (millimeter-wave (mmWave)) band (such as a 60-GHz band) is under consideration to achieve high data transfer rates. To mitigate path loss of radio waves and increase transmission distance of radio waves in an ultra-high frequency band for 5G communication systems, technologies such as beamforming, massive multiple-input multiple-output (massive MIMO), full dimensional MIMO (FD-MIMO), array antennas, analog beamforming, and large-scale antennas are being studied. Furthermore, to improve system networks for 5G communication systems, various technologies including evolved small cells, advanced small cells, cloud radio access network (Cloud-RAN), ultra-dense networks, device to device (D2D) communication, wireless backhaul, moving networks, cooperative communication, coordinated multi-points (COMP), and received-interference cancellation are currently being developed.

Moreover, the Internet has evolved from a human-centered connection network, in which humans create and consume information, to the Internet of things (IoT) network in which dispersed components such as objects exchange information with one another to process the information. Internet of Everything (IoE) technology has emerged, in which the IoT technology is combined with, for example, technology for processing big data through connection with a cloud server. To implement the IoT, technologies such as a sensing technology, a wired/wireless communication and network infrastructure, a service interface technology, and a security technology are required, and thus, research has recently been conducted into technologies such as sensor networks for interconnecting objects, machine to machine (M2M) communication, and machine type communication (MTC) In an IoT environment, intelligent Internet technology services may be provided to create new values for human life by collecting and analyzing data obtained from interconnected objects. The IoT may be applied to various fields such as smart homes, smart buildings, smart cities, smart cars or connected cars, a smart grid, health care, smart home appliances, advanced medical services, etc., through convergence and integration between existing information technology (IT) and various industries.

Thus, various attempts are being made to apply a 5G communication system to the IoT network. For example, technologies such as sensor networks, M2M communication, MTC, etc., are implemented using 5G communication techniques such as beamforming, MIMO, array antennas, etc. The application of a cloud RAN as the above-described big data processing technology may be an example of convergence between the 5G and IoT technologies.

As various services may be provided with the advancements in wireless communication systems as described above, a method for seamlessly providing these services is required.

DESCRIPTION OF EMBODIMENTS

Technical Problem

Based on the above discussion, the present disclosure provides a device and method for effectively providing a service in a mobile communication system.

BRIEF DESCRIPTION OF DRAWINGS

FIG. 22 is a diagram illustrating a transmitter and a receiver of a UE in a wireless communication system, according to an embodiment of the present disclosure.

BEST MODE

Figure 1:
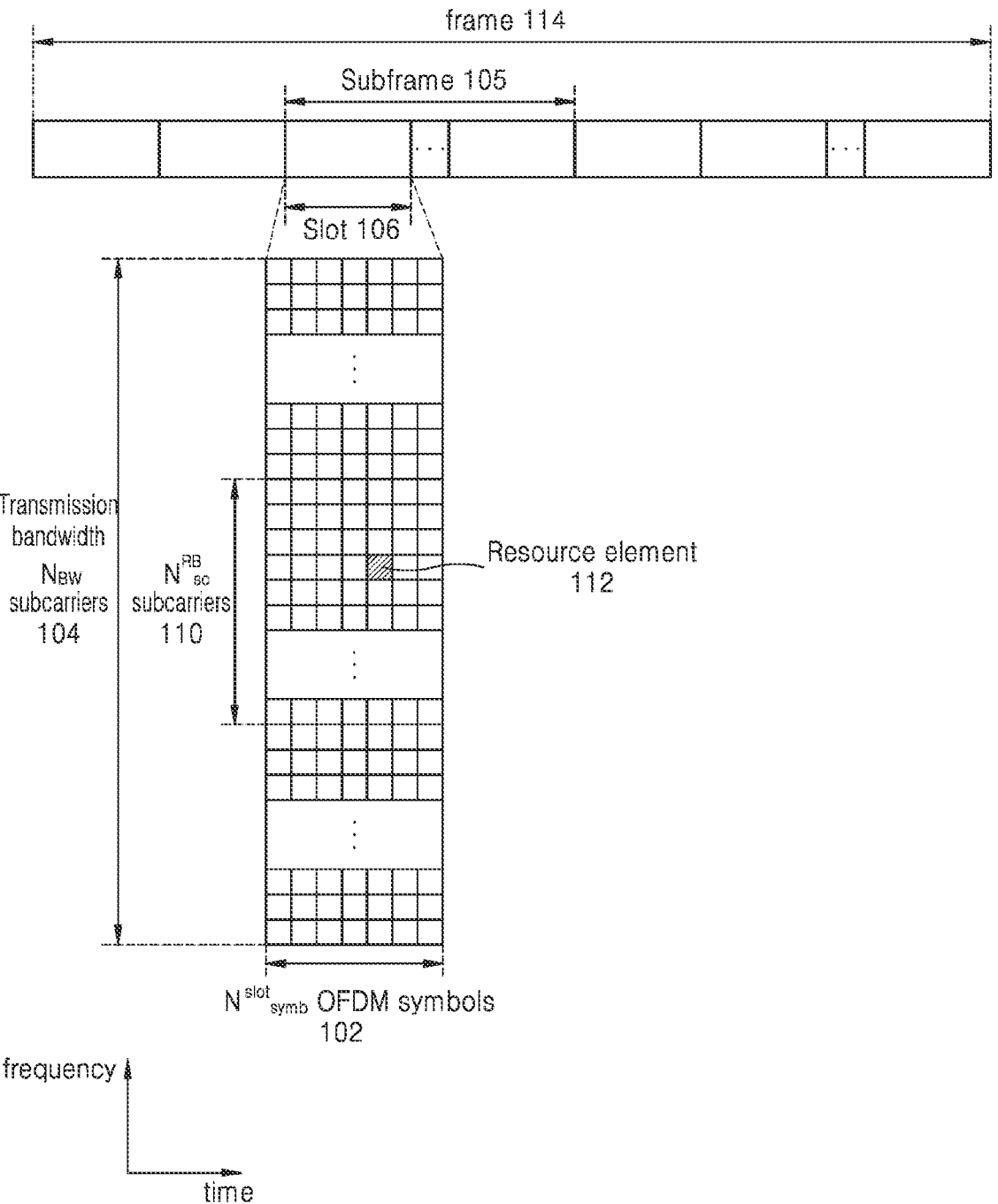
FIG. 1 illustrates a basic structure of time-frequency resource domain for a 5th generation (5G) system.

According to an embodiment of the present disclosure, an operation method of a user equipment (UE) in a wireless communication system may include receiving, from a base station, configuration information related to carrier aggregation (CA), wherein the configuration information related to the CA includes information related to cross-carrier scheduling between a primary cell (PCell) and a secondary cell (SCell), performing configuration related to the CA, based on the configuration information related to the CA, and monitoring a common search space (CSS) of the PCell on the PCell and monitoring a UE-specific search space (USS) of the SCell on the SCell, based on the performed configuration related to the CA, and receiving a physical downlink control channel (PDCCH), based on the monitoring.

According to an embodiment of the present disclosure, a UE in a wireless communication system may include a transceiver, and at least one processor configured to receive, via the transceiver, configuration information related to CA from a base station, wherein the configuration information related to the CA includes information related to cross-carrier scheduling between a PCell and an SCell, perform configuration related to the CA, based on the configuration information related to the CA, monitor a CSS of the PCell on the PCell and monitor a USS of the SCell on the SCell, based on the performed configuration related to the CA, and receive, via the transceiver, a PDCCH, based on the monitoring.

MODE OF DISCLOSURE

Hereinafter, operation principles of the present disclosure will be described in detail with reference to the accompanying drawings. Also, in the following descriptions of the present disclosure, related known functions or configurations are not described in detail when it is deemed that they would unnecessarily obscure the essence of the present disclosure. Furthermore, the terms to be described later are defined by taking functions described in the present disclosure into account and may be changed according to a user's or operator's intent or customs. Therefore, definition of the terms should be made based on the overall descriptions in the present specification.

Advantages and features of the present disclosure and methods of accomplishing the same will be more readily appreciated by referring to the following description of embodiments and the accompanying drawings. However, the present disclosure may be embodied in many different forms and should not be construed as being limited to the disclosed embodiments set forth herein; rather, the present embodiments are provided so that the present disclosure will be thorough and complete and will fully convey the concept of the disclosure to those of ordinary skill in the art, and the present disclosure will only be defined by the appended claims. Throughout the specification, like reference numerals refer to like elements.

It will be understood that each block of a flowchart in the drawings and combinations of blocks of the flowchart may be performed by computer program instructions. These computer program instructions may be loaded into a processor of a general-purpose computer, a special-purpose computer, or other programmable data processing equipment, and thus, the instructions performed via the processor of the computer or other programmable data processing equipment create a means for performing functions specified in the flowchart block(s). The computer program instructions may also be stored in a computer-executable or computer-readable memory capable of directing the computer or other programmable data processing equipment to implement functions in a specific manner, and thus, the instructions stored in the computer-executable or computer-readable memory may produce an article of manufacture including instruction means for performing the functions described in the flowchart block(s). The computer program instructions may also be loaded into the computer or other programmable data processing equipment, and thus, instructions for operating the computer or the other programmable data processing equipment by generating a computer-executed process when a series of operations are performed in the computer or the other programmable data processing equipment may provide operations for performing the functions described in the flowchart block(s).

In addition, each block may represent a portion of a module, segment, or code that includes one or more executable instructions for executing specified logical function(s). It should also be noted that, in some alternative implementations, functions mentioned in blocks may occur out of order. For example, two blocks illustrated in succession may be executed substantially simultaneously, or the blocks may sometimes be executed in reverse order depending on functions corresponding thereto.

As used herein, the term 'unit' denotes a software element or a hardware element such as a field-programmable gate array (FPGA) or an application-specific integrated circuit (ASIC), and performs certain functions. However, the term 'unit' is not limited to software or hardware. The 'unit' may be configured so as to be in an addressable storage medium, or may be configured so as to operate one or more processors. Thus, for example, the term 'unit' may include elements, such as software elements, object-oriented software elements, class elements, and task elements, processes, functions, attributes, procedures, subroutines, segments of program code, drivers, firmware, micro-codes, circuits, data, a database, data structures, tables, arrays, or variables. Functions provided by the elements and 'units' may be combined into the smaller number of elements and 'units', or may be divided into additional elements and 'units'. Furthermore, the elements and 'units' may be embodied to reproduce one or more central processing units (CPUs) in a device or security multimedia card. In addition, in an embodiment, the 'unit' may include one or more processors.

In the following descriptions of the present disclosure, related known functions or configurations are not described in detail when it is deemed that they would unnecessarily obscure the essence of the present disclosure, Hereinafter, embodiments of the present disclosure will be described in detail with reference to the accompanying drawings.

As used in the following description, terms identifying access nodes, terms indicating network entities, terms indicating messages, terms indicating interfaces between network entities, terms indicating various types of identification information, etc. are exemplified for convenience of descriptions. Accordingly, the present disclosure is not limited to terms to be described later, and other terms representing objects having the equivalent technical meaning may be used.

In the following description, a physical channel and a signal may be used interchangeably with data or a control signal. For example, a physical downlink shared channel (PDSCH) is a term referring to a physical channel on which data is transmitted, but the PDSCH may also be used to refer to data. That is, in the present disclosure, the expression 'transmitting a physical channel' may be interpreted as having the same meaning as the expression 'transmitting data or a signal through a physical channel'.

Hereinafter, in the present disclosure, higher layer signaling refers to a signal transmission method in which a signal is transmitted from a base station (BS) to a terminal using a physical layer downlink data channel or from a terminal to a BS via a physical layer uplink data channel. The higher layer signaling may be understood as radio resource control (RRC) signaling or a media access control (MAC) control element (CE).

Hereinafter, for convenience of descriptions, the present disclosure uses terms and names defined in the 3rd Generation Partnership Project New Radio (3GPP NR) standard. However, the present disclosure is not limited to the terms and names but may also be identically applied to systems that comply with other standards. In the present disclosure, for convenience of descriptions, a next-generation Node B (gNB) may be used interchangeably with an evolved Node B (eNB). In other words, a BS described as an eNB may represent a gNB. Furthermore, the term 'terminal' may refer to a mobile phone, a machine type communication (MTC) device, a narrowband Internet of things (NB-IoT) device, a sensor, and other wireless communication devices.

Hereinafter, a BS is an entity that allocates resources to a terminal, and may be at least one of a gNB, an eNB, a Node B, a BS, a wireless access unit, a BS controller, or a network node. A terminal may include a user equipment (UE), a mobile station (MS), a cellular phone, a smart phone, a computer, or a multimedia system capable of performing a communication function. However, the terminal is not limited to the above examples.

Recently, in order to handle explosively growing mobile data traffic, an initial standard for a 5th generation (5G) system or new radio (NR) access technology, which is a next-generation communication system after long term evolution (LTE) or evolved universal terrestrial radio access (E-UTRA) and LTE-Advanced (LTE-A) or E-UTRA evolution, has been finalized. While the existing mobile communication systems focused on general voice/data communication, 5G systems aim to satisfy various services and requirements, such as enhanced Mobile BroadBand (eMBB) services for improving the existing voice/data communication, Ultra-Reliable and Low Latency Communication (URLLC) services, massive MTC (mMTC) services for supporting communication between a massive number of devices, etc.

In contrast to legacy LTE and LTE-A systems where a maximum system transmission bandwidth per carrier is limited to 20 megahertz (MHz), 5G systems mainly aim at provide data services at ultra-high speeds of several gigabits per second (Gbps) by using a ultrawide bandwidth that is much wider than the transmission bandwidth of the legacy LTE and LTE-A systems. Accordingly, for the 5G systems, an ultra-high frequency band from several gigahertz (GHz) up to 100 GHz, in which frequencies having ultrawide bandwidths are easily made available, is being considered as a candidate frequency. Additionally, wide-bandwidth frequencies for the 5G systems may be obtained by reassigning or allocating frequencies among frequency bands included in a range of several hundreds of megahertz (MHz) to several GHz used by the existing mobile communication systems.

A radio wave in the ultra-high frequency band has a wavelength of several millimeters (mm) and is also referred to as a millimeter wave (mmWave). However, in the ultra-high frequency band, a pathloss of radio waves increases with an increase in frequency, and thus, a coverage range of a mobile communication system is reduced.

In order to overcome the reduction in coverage in the ultra-high frequency band, a beamforming technology is applied to increase a radio wave arrival distance by focusing a radiation energy of radio waves to a certain target point using a plurality of antennas. In other words, a signal to which the beamforming technology is applied has a relatively narrow beamwidth, and radiation energy is concentrated within the narrow beam width, so that the radio wave arrival distance is increased. The beamforming technology may be applied at both a transmitter and a receiver. In addition to increasing the coverage range, the beamforming technology also has an effect of reducing interference in a region other than a beamforming direction. To properly implement the beamforming technology, an accurate transmit/receive beam measurement and feedback method is required. The beamforming technology may be applied to a control channel or a data channel having a one-to-one correspondence between a certain UE and a BS. In addition, to increase coverage, the beamforming technology may be applied for control channels and data channels via which the BS transmits, to multiple UEs in a system, common signals such as a synchronization signal, a physical broadcast channel (PBCH), and system information. When the beamforming technology is applied to the common signals, a beam sweeping technique for transmitting a signal by changing a beam direction is additionally applied to allow the common signals to reach a UE located at any position within a cell.

As another requirement for the 5G systems, an ultra-low latency service with a transmission delay about 1 ms between a transmitter and a receiver is required. As a method for reducing the transmission delay, a frame structure based on a short transmission time interval (TTI) compared to that in LTE and LTE-A needs to be designed. A TTI is a basic time unit for performing scheduling, and a TTI in the legacy LTE and LTE-A systems corresponds to one subframe with a length of 1 ms. For example, as a short TTI for satisfying the requirement for the ultra-low latency service in the 5G systems, TTIs of 0.5 ms, 0.25 ms, 0.125 ms, etc. that are shorter than the TTI in the legacy LTE and LTE-A systems may be supported.

The present disclosure relates to a method and apparatus used for a UE to transmit and receive a signal in a wireless communication system to which carrier aggregation (CA) is applied.

The present disclosure relates to a cellular wireless communication system, and to a method, performed by a UE performing a CA operation, of transmitting and receiving a control channel and a data channel.

The present disclosure may provide a method for eliminating scheduling constraints due to a shortage of radio resources in a mobile communication system.

The present disclosure may define a method of scheduling a UE in a mobile communication system supporting CA, thereby solving a cell capacity shortage that may occur in a given cell.

FIG. 1 illustrates a basic structure of a time-frequency resource domain for a 5G system. In other words, FIG. 1 is a diagram showing the basic structure of a time-frequency resource domain that is a radio resource region for transmitting data or a control channel in a 5G system.

Referring to FIG. 1, the horizontal axis represents a time domain and the vertical axis represents a frequency domain. The smallest transmission unit in the time domain in a 5G system is an orthogonal frequency division multiplexing (OFDM) symbol, a number of $$N_{symb}^{slot}$$

OFDM symbols 182 may be grouped to form one slot 106, and a number of $$N_{slot}^{subframe}$$

slots may be grouped to form one subframe 105. The subframe may have a length of 1.0 ms, and 10 subframes may be grouped into a 10-ms frame 114. The smallest transmission unit in the frequency domain is a subcarrier, and an overall system transmission bandwidth may be composed of a total of $N_{BW}$ subcarriers 104.

A basic resource unit in the time-frequency domain is a resource element (RE) 112 that may be represented by an OFDM symbol index and a subcarrier index. A resource block (RB) may be defined as $$N_{sc}^{RB}$$

consecutive sub-carriers 110 in the frequency domain. In the 5G system, $$N_{sc}^{RB} = 12,$$

and a data rate may increase in proportion to the number of RBs scheduled to a UE.

In the 5G system, a BS may map data in units of an RB and generally perform scheduling for a certain UE in units of an RB constituting one slot. In other words, in the 5G system, a basic time unit for scheduling may be a slot, and a basic frequency unit for scheduling may be an RB.

The number $$N_{symb}^{slot}$$

of OFDM symbols is determined based on a length of a cyclic prefix (CP) added to each symbol to prevent inter-symbol interference, and for example, $$N_{symb}^{slot} = 14$$

when a normal CP is applied, and $$N_{symb}^{slot} = 12$$

when an extended CP is applied. The extended CP may be applied to a system having a relatively long radio wave transmission distance compared to that for the normal CP, thereby maintaining orthogonality between symbols. For the normal CP, a ratio of a CP length to a symbol length may be maintained at a constant value to keep an overhead due to the CP constant regardless of a subcarrier spacing. In other words, as a subcarrier spacing becomes narrower, a symbol length may increase, and accordingly, a CP length may increase. On the other hand, as a subcarrier spacing becomes wider, a symbol length may decrease, and accordingly, a CP length may decrease, A symbol length and a CP length may be inversely proportional to a subcarrier spacing.

In the 5G system, in order to satisfy various services and requirements, various frame structures may be supported by adjusting a subcarrier spacing. For example, In terms of an operating frequency band, a wider subcarrier spacing is more beneficial for recovery from phase noise in a high frequency band.

In terms of a transmission time, when a subcarrier spacing becomes wider, a symbol length in the time domain is shortened, which leads to a shorter slot, and thus, the wider subcarrier spacing is more advantageous for supporting ultra-low latency services such as URLLC.

In terms of cell size, a larger cell may be supported as a CP length becomes larger, and thus, as a subcarrier becomes narrower, a relatively larger cell may be supported. A cell is a concept indicating an area covered by one BS in mobile communication.

The subcarrier spacing, the CP length, etc. are essential information for OFDM transmission and reception, and the BS and the UE need to recognize such information as a common value to enable seamless transmission and reception. Table 1 shows a relationship among a subcarrier spacing configuration μ, a subcarrier spacing Δf, and a CP length supported by the 5G system.

TABLE 1

| μ | $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Table 2 shows the number $$N_{symb}^{slot}$$

of symbols per slot the number $$N_{slot}^{frame,\mu}$$

of slots per frame, and the number $$N_{slot}^{subframe,\mu}$$

of slots per subframe for each subcarrier spacing configuration in the case of a normal CP.

TABLE 2

| μ | $N_{symb}^{slot}$ | $N_{slot}^{frame,\,\mu}$ | $N_{slot}^{subframe,\,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 shows the number $$N_{symb}^{slot}$$

of symbols per slot, the number $$N_{slot}^{frame,\mu}$$

of slots per frame, and the number $$N_{slot}^{subframe,\mu}$$

of slots per subframe for each subcarrier spacing configuration μ in the case of an extended CP.

TABLE 3

| μ | $N_{symb}^{slot}$ | $N_{slot}^{frame,\,\mu}$ | $N_{slot}^{subframe,\,\mu}$ |
|---|---|---|---|
| 2 | 12 | 40 | 4 |

Figure 2:
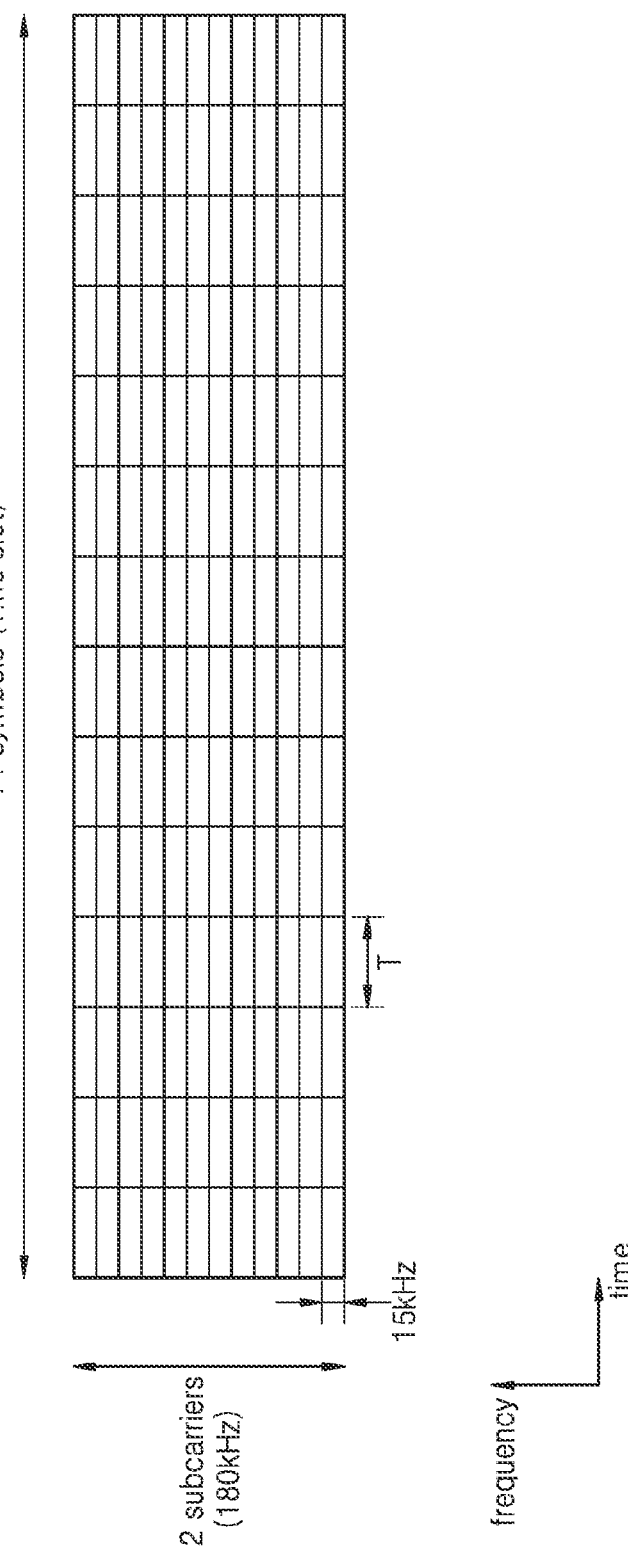
FIG. 2 illustrates an example of a frame structure of a 5G system.
Figure 3:
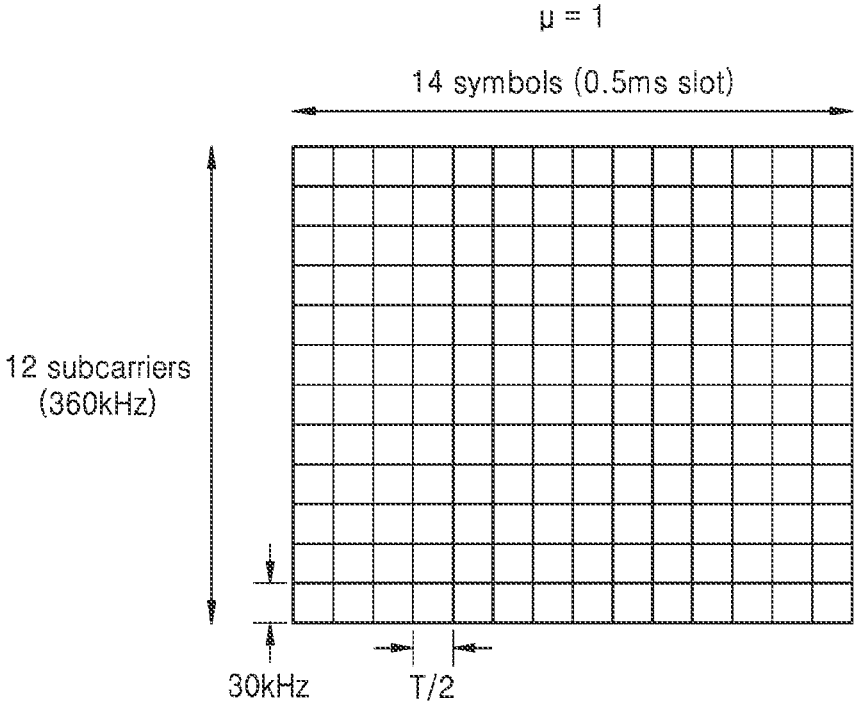
FIG. 3 illustrates another example of a frame structure for a 5G system.
Figure 4:
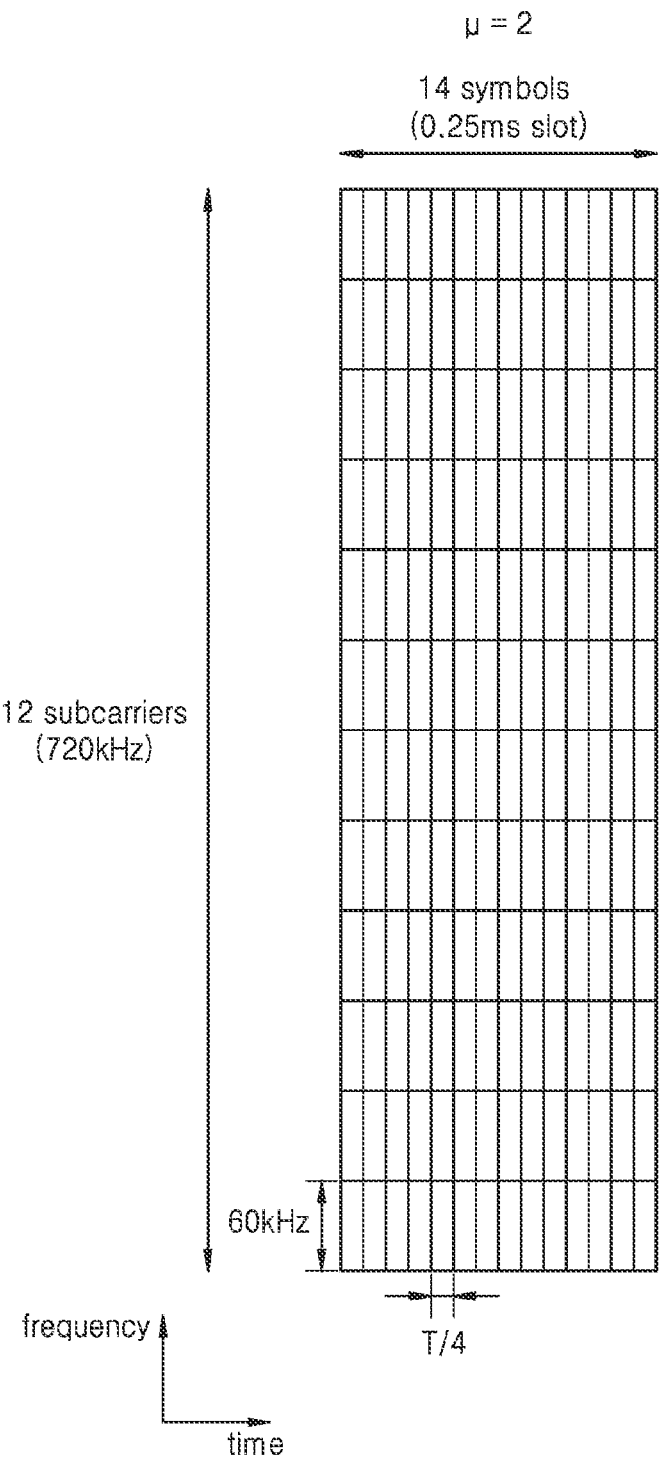
FIG. 4 illustrates another example of a frame structure for a 5G system.

FIGS. 2, 3, and 4 respectively show examples of frame structures when a subcarrier spacing configuration μ is 0, 1, and 2, and a normal CP is used. In the examples of FIGS. 2, 3, and 4, a subcarrier spacing, a CP length, a slot length, etc. are included as an essential parameter set defining a frame structure.

At an early stage of introduction of the 5G system, at least coexistence or dual mode operation with a legacy LTE/ LTE-A system is expected. As a result, the legacy LTE/ LTE-A system may provide a stable system operation to the UE, and the 5G system may provide enhanced services to the UE. Therefore, a frame structure of the 5G system needs to include at least a frame structure or an essential parameter set (subcarrier spacing=15 kHz) of the legacy LTE/LTE-A system.

FIG. 2 illustrates an example of a frame structure of a 5G system. In other words, FIG. 2 illustrates a 5G frame structure or an essential parameter set that is substantially the same as a frame structure of an LTE/LTE-A.

Referring to FIG. 2, the example of FIG. 2 is a frame structure with a subcarrier spacing configuration μ=0, in which a subcarrier spacing is 15 kHz, 14 symbols constitute a 1 ms slot, and 12 subcarriers (=180 kHz=12×15 kHz) constitute an RB. In this case, 1 slot may constitute a subframe, and 10 subframes may constitute a frame.

FIG. 3 illustrates another example of a frame structure for a 5G system.

Referring to FIG. 3, the example of FIG. 3 is a frame structure with a subcarrier spacing configuration μ=1, in which a subcarrier spacing is 30 kHz, 14 symbols constitute a 0.5 ms slot, and 12 subcarriers (=360 kHz=12×30 kHz) constitute an RB. In other words, the subcarrier spacing and the RB size of the frame structure of FIG. 3 are two times larger than those of the frame structure of FIG. 2, whereas a slot length and a symbol length of the frame structure of FIG. 3 are two times smaller than those of the frame structure of FIG. 2. In this case, 2 slots may constitute a subframe, and 20 subframes may constitute a frame.

FIG. 4 illustrates another example of a frame structure for a 5G system.

Referring to FIG. 4, the example of FIG. 4 is a frame structure with a subcarrier spacing configuration μ=2, in which a subcarrier spacing is 60 kHz, 14 symbols constitute a 0.25 ms subframe, and 12 subcarriers (=720 kHz=12×60 kHz) constitute an RB. In other words, the subcarrier spacing and the RB size of the frame structure of FIG. 4 are four times larger than those of the frame structure of FIG. 2, whereas a slot length and a symbol length of the frame structure of FIG. 4 are four times smaller than those of the frame structure of FIG. 2. In this case, 4 slots may constitute a subframe, and 40 subframes may constitute a frame.

That is, when the frame structures described with reference to FIGS. 2 to 4 are generalized, high scalability may be provided by increasing or decreasing a subcarrier spacing, a CP length, a slot length, etc., which are an essential parameter set, of each frame structure by factors of an integer compared to another frame structure. Furthermore, a subframe having a fixed length of 1 ms may be defined to indicate a reference time unit regardless of types of a frame structure.

The frame structures illustrated in FIGS. 2 to 4 may be applied to correspond to various scenarios. In terms of a cell size, because a larger cell may be supported as a CP length becomes larger, the frame structure of FIG. 2 may support a relatively large cell compared to the frame structures of FIGS. 3 and 4. In terms of an operating frequency band; because a wider subcarrier spacing is more beneficial for recovery from phase noise in a high frequency band, the frame structure of FIG. 4 may support a relatively high operating frequency compared to the frame structures of FIGS. 2 and 3. From a service perspective, because a smaller length of a slot as a basic scheduling unit is more advantageous for supporting ultra-low latency services such as URLLC, the frame structure of FIG. 4 may be more suitable for a URLLC service than the frame structures of FIGS. 2 and 3.

In the following description of the present disclosure; uplink (UL) refers to a radio link through which a UE transmits data or a control signal to a BS, and downlink (DL) refers to a radio link through which the BS transmits data or a control signal to the UE.

During an initial access procedure in which the UE accesses a system for the first time, the UE may perform cell search to attain DL time and frequency synchronization and obtain a cell identity (ID) from a synchronization signal transmitted by the BS. The UE may then use the obtained cell ID to receive a PBCH, and obtain a master information block (MIB) that is essential system information from the PBCH. In addition, the UE may receive system information (e.g., a system information block (SIB)) transmitted by the BS to obtain cell-common transmission/reception related control information. The cell-common transmission/reception related control information may include random access related control information, paging related control information, common control information regarding various physical channels, etc.

A synchronization signal is used as a reference for the cell search, and a subcarrier spacing may be applied to the synchronization signal for each frequency band and to be suitable for a channel environment, e.g., phase noise. For a data channel or a control channel, different subcarrier spacings may be applied depending on a service type in order to support various services as described above.

Figure 5:
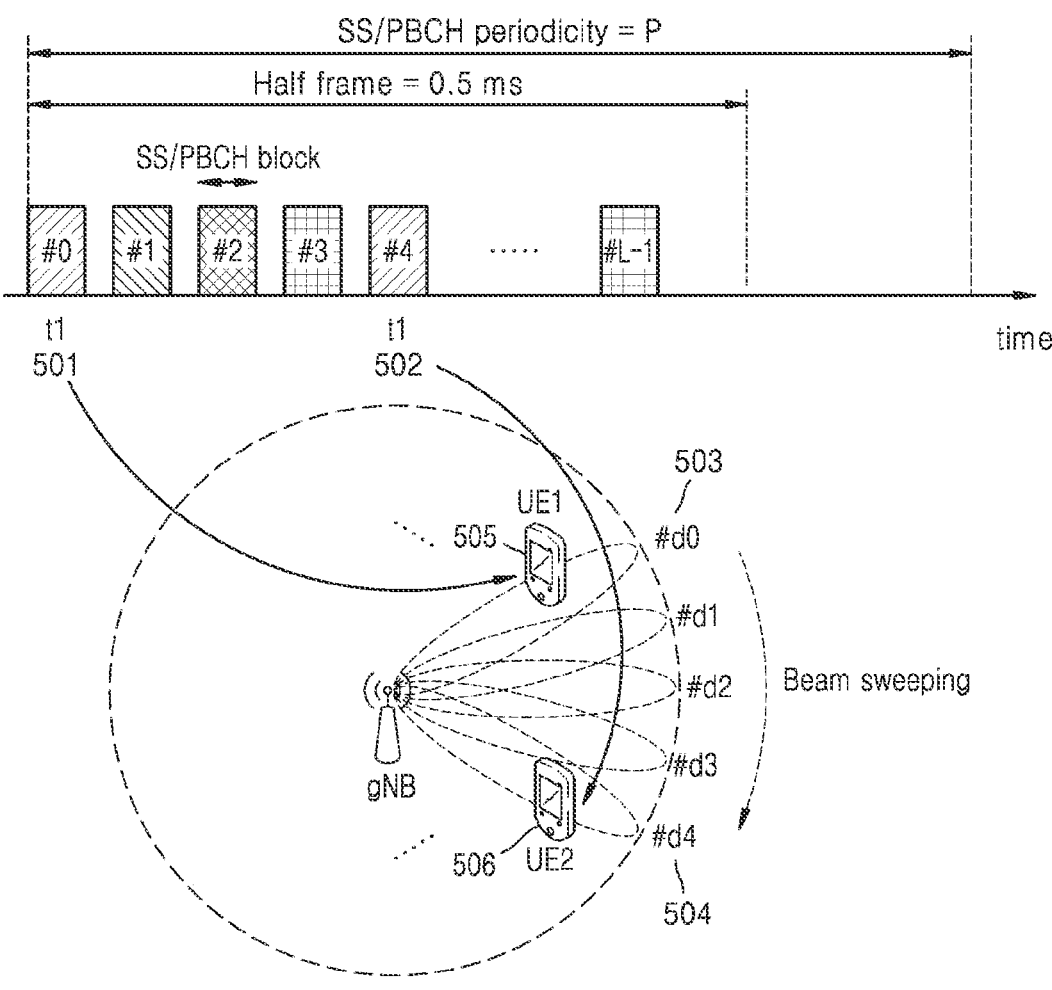
FIG. 5 illustrates a time domain mapping structure and a beam sweeping operation for a synchronization signal.

FIG. 5 illustrates a time domain mapping structure and a beam sweeping operation for a synchronization signal.

The following components may be defined for description.

Primary synchronization signal (PSS): It is a signal used as a reference for DL time/frequency synchronization.

Secondary synchronization signal (SSS): It is used as a reference for DL time/frequency synchronization and provides cell ID information. The SSS may also serve as a reference signal for demodulation of a PBCH, Physical broadcast channel (PBCH): A PBCH may provide a master information block that is essential system information needed for the UE to transmit and receive a data channel and a control channel. The essential system information may include search space related control information indicating radio resource mapping information of a control channel, scheduling control information of a separate data channel for transmitting system information, information such as a system frame number (SEN) that is an index in a frame level that becomes a timing reference.

SS/PBCH block (or SSB): The SS/PBCH block consists of N OFDM symbols and is a combination of the PSS, the SSS, and the PBCH. For a system using a beam sweeping technique, an SS/PBCH block is the smallest unit for applying beam sweeping. In the 5G system, N=4. The BS may transmit a maximum of L SS/PBCH blocks, and the L SS/PBCH blocks are mapped within a half frame (0.5 ms). In addition, the L SS/PBCH blocks are periodically repeated with a periodicity P. The BS may inform the UE of the periodicity P via signaling. If there is no separate signaling for the periodicity P, the UE applies a predetermined default value, FIG. 5 illustrates that beam sweeping is applied in units of an SS/PBCH block over time. In the example of FIG. 5, a first UE (UE1) 505 may receive an SS/PBCH block via a beam radiated in direction #d0 503 due to beamforming applied to SS/PBCH block #0 at a time point t1 501. Also, a second UE (UE2) 506 may receive an SS/PBCH block via a beam radiated in direction #d4 504 due to beamforming applied to SS/PBCH block #4 at a time point t2 502. The UE may obtain an optimal synchronization signal via a beam radiated from the BS in a direction toward a location of the UE. For example, it may be difficult for the UE1 505 to obtain time/frequency synchronization and essential system information from an SS/PBCH block via the beam radiated in the direction #d4 504 that is far away from the UE1 505.

In addition to reception for the initial access procedure, the UE may receive an SS/PBCH block to determine whether a radio link quality of a current cell is maintained above a certain threshold level. Furthermore, in a procedure for performing handover of a UE from the current cell to a neighboring cell, the UE may receive an SS/PBCH block from the neighboring cell in order to determine a radio link quality of the neighboring cell and obtain time/frequency synchronization of the neighboring cell.

After the UE obtains MIB and system information from the BS through the initial access procedure, the UE may perform a random access procedure to switch a link with the BS to a connected state (or RRC CONNECTED state). Upon completion of the random access procedure, the UE transitions to a connected state, and one-to-one communication is enabled between the BS and the UE. Hereinafter, a random access procedure will be described in detail with reference to FIG. 6.

Figure 6:
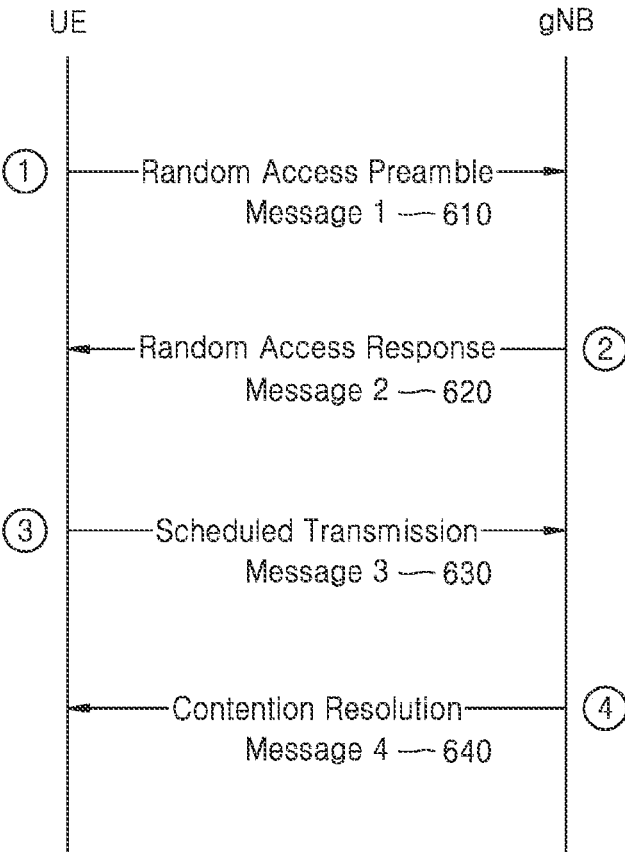
FIG. 6 illustrates a random access procedure.

FIG. 6 illustrates a random access procedure.

Referring to FIG. 6, in a first step 610 of the random access procedure, a UE transmits a random access preamble to a BS. In the random access procedure, the random access preamble, which is a first message transmitted by the UE, may be referred to as Message 1. The BS may measure a propagation delay value between the UE and the BS from the random access preamble and achieve UL synchronization. In this case, the UE may randomly select a random access preamble to use from a set of random access preambles given by system information in advance. In addition, an initial transmission power for the random access preamble may be determined according to a pathloss between the BS and the UE, which is measured by the UE. Also, the UE may transmit the random access preamble by determining a direction of a transmit beam for the random access preamble based on a synchronization signal received from the BS.

In step 2 620, the BS transmits a UL transmission timing control command to the UE based on the propagation delay value measured from the random access preamble received in the step 1 610. The BS may also transmit, to the UE, a UL resource to be used by the UE and a power control command as scheduling information. Control information regarding a UL transmit beam of the UE may be included in the scheduling information.

If the UE does not successfully receive, from the BS, a random access response (RAR) (or Message 2) that is scheduling information for Message 3 within a certain time period in the second step 620, the UE may perform the first step 610 again. If the UE performs the first step 610 again, the UE may transmit the random access preamble with transmission power increased by a certain step (power ramping step), thereby increasing the probability of reception of the random access preamble at the BS.

In a third step 630, the UE transmits UL data (message 3) including its UE ID to the BS through a UL data channel (e.g., a physical UL shared channel (PUSCH)) by using the UL resource allocated in the second step 620. A transmission timing of the UL data channel for transmitting the Message 3 may be controlled according to the timing control command received from the BS in the second step 620. In addition, a transmission power for the UL data channel for transmitting the Message 3 may be determined by taking into account the power control command received from the BS in the second step 620 and a power ramping value applied to the random access preamble. The UL data channel for transmitting the Message 3 may mean a first UL data signal transmitted by the UE to the BS after the UE transmits the random access preamble.

In a fourth step 640, when the BS determines that the UE has performed the random access procedure without colliding with another UE, the BS may transmit data (Message 4) including an ID of the UE that has transmitted the UL data in the third step 630 to the corresponding UE. Upon receiving a signal transmitted by the BS in the fourth step 640, the UE may determine that the random access procedure is successful. In addition, the UE may transmit, to the BS, hybrid automatic repeat request acknowledgement (HARQ-ACK) information indicating whether the Message 4 has been successfully received through a UL control channel (e.g., a physical UL control channel (PUCCH)).

If the data transmitted by the UE in the third step 630 collides with data transmitted by another UE and thus the BS fails to receive a data signal from the UE, the BS may no longer transmit data to the UE. Accordingly, if the UE fails to receive the data transmitted by the BS in the fourth step 640 within a certain time period, the UE may determine that the random access procedure has failed and restart the random access procedure from the first step 610.

Upon successful completion of the random access procedure, the UE may transition to a connected state, and one-to-one communication between the BS and UE is enabled. The BS may receive UE capability information from the UE in the connected state and adjust scheduling based on the UE capability information of the corresponding UE. The UE may inform, via the UE capability information, the BS of whether the UE itself supports a certain functionality, a maximum allowable value of the functionality supported by the UE, etc. Accordingly, the UE capability information reported by each UE to the BS may have a different value for each UE.

As an example, the UE may report, to the BS, UE capability information including at least some of the following control information as the UE capability information.

Control information related to a frequency band supported by the UE

Control information related to a channel bandwidth supported by the UE

Control information related to a highest modulation scheme supported by the UE

Control Information related to a maximum number of beams supported by the UE

Control information related to a maximum number of layers supported by the UE

Figure 7:
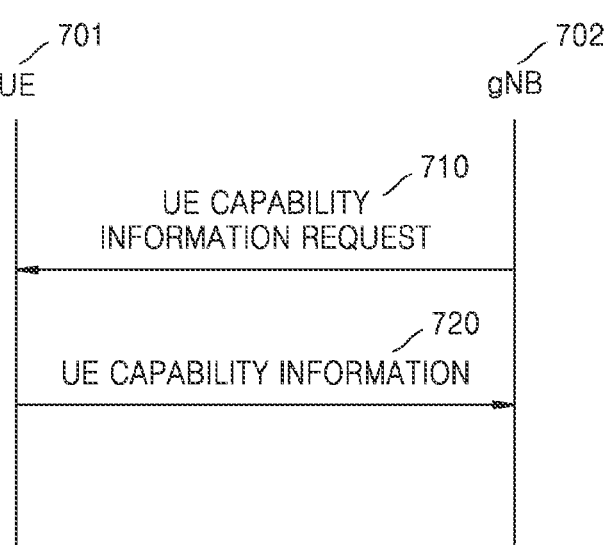
FIG. 7 illustrates a procedure in which a user equipment (UE) reports UE capability information to a base station.

Control information related to channel state information (CSI) reporting supported by the UE Control information about whether the UE supports frequency hopping Control information related to a bandwidth when CA is supported Control information about whether cross-carrier scheduling is supported when CA is supported FIG. 7 illustrates a procedure in which a UE reports UE capability information to a BS.

Referring to FIG. 7, in operation 710, a BS 702 may transmit a UE capability information request message to a UE 701. In response to a request for UE capability information from the BS, the UE transmits UE capability information to the BS in operation 720.

Hereinafter, a scheduling method wherein a BS transmits DL data to a UE or indicates UL data transmission performed by the UE.

Downlink control information (DCI) is control information transmitted by the BS to the UE via a DL link and may include DL data scheduling information or UL data scheduling information for a certain UE. In general, the BS may independently channel-code DCI for each UE and then transmit it to a corresponding UE through a physical downlink control channel (PDCCH) that is a physical control channel for DL.

The BS may apply and operate a predefined DCI format for a UE to be scheduled according to purposes such as whether DCI carries scheduling information for DL data (DL assignment), whether the DCI carries scheduling information for UL data (UL grant), whether spatial multiplexing using multiple antennas is applied, whether the DCI is DCI for power control, etc.

The BS may transmit DL data to the UE through a PDSCH that is a physical channel for DL data transmission. The BS may inform the UE of scheduling information, such as a specific mapping location in the time-frequency domain for the PDSCH, a modulation scheme, HARQ related control information, power control information, etc., via DCI related to DL data scheduling information among DCIs transmitted on the PDCCH.

The UE may transmit UL data to the BS through a PUSCH, which is a physical channel for UL data transmission. The BS may inform the UE of scheduling information, such as a specific mapping location in the time-frequency domain for the PUSCH, a modulation scheme, HARQ-related control information, power control information, etc., via DCI related to UL data scheduling information among DCIs transmitted through the PDCCH.

As described above, in order to achieve data services at ultra-high speeds of several Gbps for a 5G system, signal transmission and reception over ultrawide bandwidths of several tens to several hundreds of MHz or several GHz may be supported. The signal transmission and reception over the ultrawide bandwidths may be supported through a single component carrier (CC) or a CA technology that combines multiple CCs. In a case that a mobile operator fails to acquire a sufficiently high bandwidth frequency to provide ultra-high-speed data services with a single CC, a CA technology may combine individual component carriers having relatively small bandwidths to increase a total frequency bandwidth, thereby consequently enabling ultra-high-speed data services.

Figure 8:
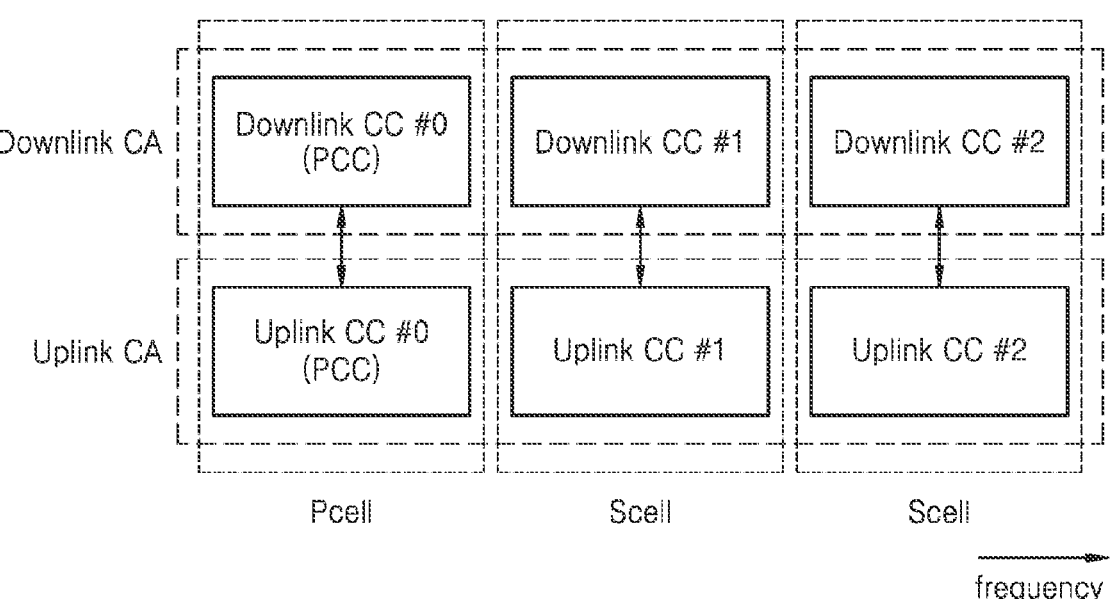
FIG. 8 is a diagram illustrating a concept of carrier aggregation (CA).

FIG. 8 is a diagram illustrating a concept of CA.

FIG. 8 shows an example of configuring a 5G system by combining three CCs for each of UL and DL. In a CA system, each CC may be classified as a primary cell (PCell) or a secondary cell (SCell) for operation. A PCell (or a first cell) may be a cell that provides basic radio resources to the UE and is used as a reference cell by the UE to perform operations such initial access and handover. The PCell may consist of a DL primary frequency (or a primary component carrier; PCC) and a UL primary frequency. The UE may transmit, through a PUCCH that is a UL control channel, UL control information (UCI) including HARQ ACK/NACK that is feedback information indicating whether data received from the BS is erroneous, CSI indicating a channel state between the BS and the UE, or the Ike, and the PUCCH may be transmitted on a PCell. And, an SCell (or a second cell) is a cell that provides additional radio resources together with the PCell to the UE, and may consist of a DL secondary frequency (or a secondary component carrier (SCC)) and a UL secondary frequency or only a DL secondary frequency. CCs may be configured independently of each other, and DL CA and the UL CA are applicable independently. For example, CA combining a CC of 100 MHz bandwidth and two CCs of 50 MHz bandwidth may be applied for the DL, while only one component carrier of 100 MHz bandwidth may be used in the UL (i.e., CA may not be applied for the UL). In the present disclosure, unless otherwise specified, the terms cell and CC may be used interchangeably without any regard to distinction therebetween. The BS may inform, via signaling, the UE of CA related configurations such as which CC to combine, how many CCs to combine, or control information related to a bandwidth of each CC.

In a CA system, control information and data may be generated and transmitted independently for each CC. In detail, a method of scheduling a UE in a CA system may be classified into two types: a self-carrier scheduling method and a cross-carrier scheduling method.

Figure 9:
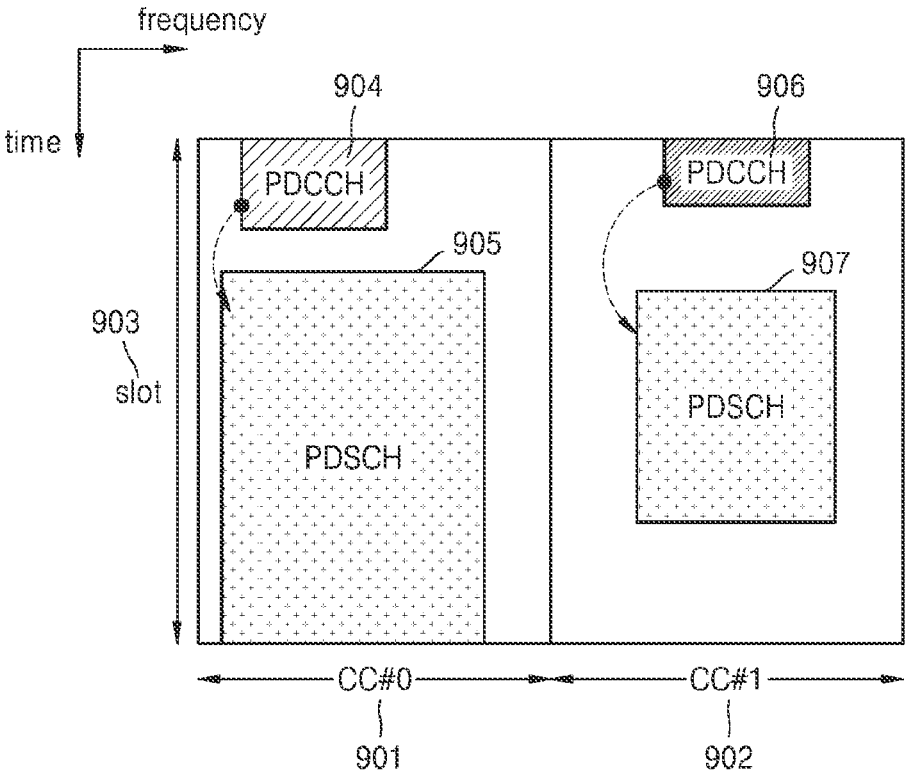
FIG. 9 is a diagram illustrating a self-carrier scheduling method in CA.

FIG. 9 is a diagram illustrating a self carrier scheduling method in CA.

Referring to FIG. 9, it is assumed that two DL CCs (CC #0 901 and CC #1 902) are combined in a 5G system. In the example of FIG. 9, the BS may transmit DL data channels (e.g., PDSCHs 905 and 907) to an arbitrary UE through the CC #0 901 and CC #1 902. In this case, a PDCCH 904 for scheduling the PDSCH 905 on the CC #0 901 may be transmitted to the UE through the CC #0 901, and a PDCCH 906 for scheduling the PDSCH 907 on the CC #1 902 may be transmitted to the UE through the CC #1 902. As described above, a scheduling method in which a data channel and a control channel for scheduling the data channel are transmitted on the same carrier or the same cell may be referred to as self-carrier scheduling.

Figure 10:
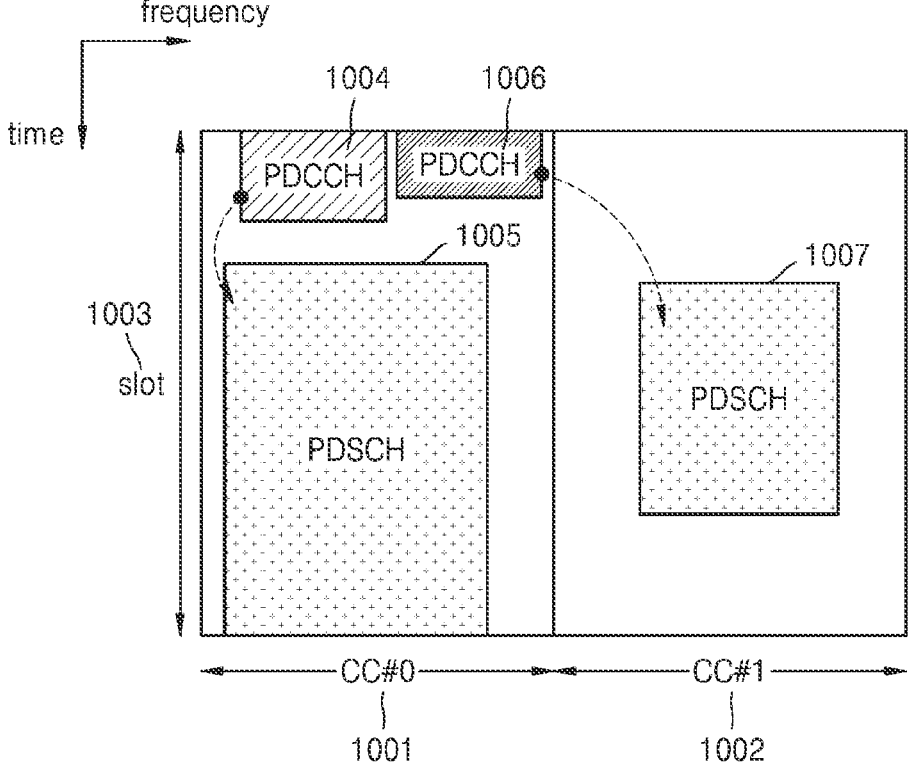
FIG. 10 is a diagram illustrating a cross-carrier scheduling method in CA.

FIG. 10 is a diagram illustrating a cross-carrier scheduling method when CA is applied.

FIG. 10 shows an example of a system in which CA is applied to two DL CCs (CC #0 1001 and CC #1 1002). Referring to FIG. 10, the BS may transmit DL data channels (e.g., PDSCHs 1005 and 1007) to an arbitrary UE through the CC #0 1001 and CC #1 1002. In this case, a PDCCH 1004 for scheduling the PDSCH 1005 on the CC #0 1001 and a PDCCH 1006 for scheduling the PDSCH 1007 on the CC #1 1002 may be both transmitted to the UE on the CC #0 1001. In other words, in the case of CC #1 1001, a data channel and a control channel for scheduling the data channel may be transmitted on different carriers or different cells. Such a scheduling method may be referred to as cross-carrier scheduling.

Although the DL CA technology has been described with reference to FIGS. 9 and 10, the examples of FIGS. 9 and 10 may also be applied equally to a UL CA technology.

Cross-carrier scheduling may obtain the following effects compared to self-carrier scheduling.

1) Control channel offloading: When radio resources for transmitting a control channel is insufficient on a certain carrier, the control channel may be transmitted on a separate carrier having relatively sufficient radio resources. For example, in FIG. 10, assuming that the CC #1 has a bandwidth of 20 MHz and the CC #0 has a bandwidth of 100 MHz, radio resources for transmitting a control channel may be sufficient on the CC #0.

2) Control channel interference management: Relatively strong interference may occur in a certain carrier due to factors from the surrounding environment, frequency characteristics, etc. Due to the interference, the performance of control channel transmission and reception may deteriorate, and such deterioration of the performance of control channel transmission and reception may be avoided by transmitting a control channel on a carrier relatively slightly affected by the interference. On the other hand, a data channel may be recovered by an HARQ operation even if errors occur in transmission and reception of the data channel, and thus, the data channel suffers from less performance deterioration due to interference than the control channel.

Dynamic spectrum sharing (DSS) is now described. A scenario in which LTE and 5G systems are deployed and operates in the same frequency band or a frequency band where the LTE and 5G systems overlap in the frequency domain may be referred to as DSS or LTE-NR coexistence. In a system operating DSS, whether to schedule LTE or 5G to the UE may be adjusted according to changes in LTE traffic and 5G traffic. In an early stage of 5G system installation when LTE traffic gradually decreases and 5G traffic gradually increases, DSS may be used to promote the expansion of 5G without additional frequency allocation by utilizing existing frequencies to the fullest extent. From the perspective of telecommunication service providers, DSS operation allows efficient utilization of already used frequencies without wasting them.

Figure 11A:
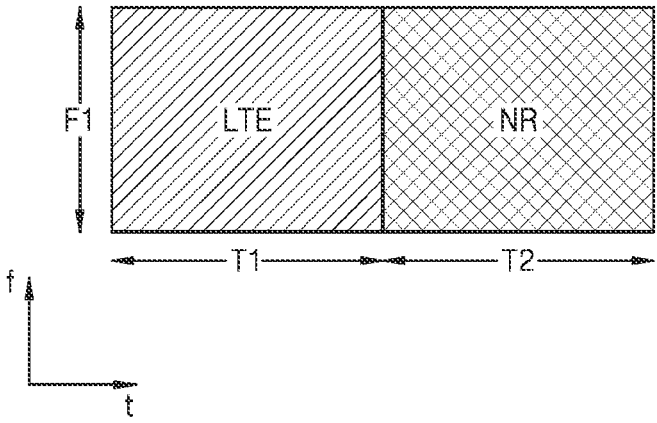
FIG. 11A illustrates an example in which long-term evolution (LTE) and 5G systems overlap in the same frequency band.
Figure 11B:
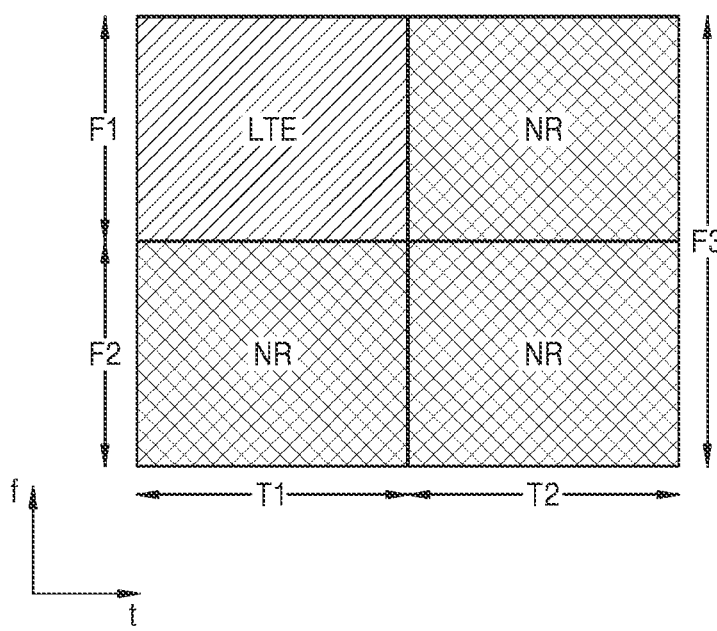
FIG. 11B illustrates an example in which LTE and 5G systems partially overlap in the frequency domain.

FIGS. 11A and 11B are diagrams illustrating the concept of DSS.

FIG. 11A illustrates an example in which LTE and 5G systems overlap in the same frequency band.

Referring to FIG. 11A, the BS may determine when to schedule LIE and when to schedule 5G according to a distribution of LTE traffic and 5G traffic. FIG. 11A shows an example in which LIE is scheduled during a time period T1 and 5G is scheduled during a time period T2.

FIG. 11B illustrates an example in which LTE and 5G systems partially overlap in the frequency domain.

Referring to FIG. 11B, FIG. 11B shows an example in which LTE is scheduled in a frequency region F1 during a time period T1 while 5G is scheduled in a frequency region F2 during the time period T1. Also, in the example of FIG. 11B, 5G is scheduled in a frequency region F3 (=F1+F2) during a time period T2. Although FIGS. 11A and 11B both show that LTE and 5G share time/frequency resources, deterioration of transmission and reception performance may be minimized by preventing LTE and 5G from colliding with each other in the time/frequency resources at any instant of time.

Figure 12:
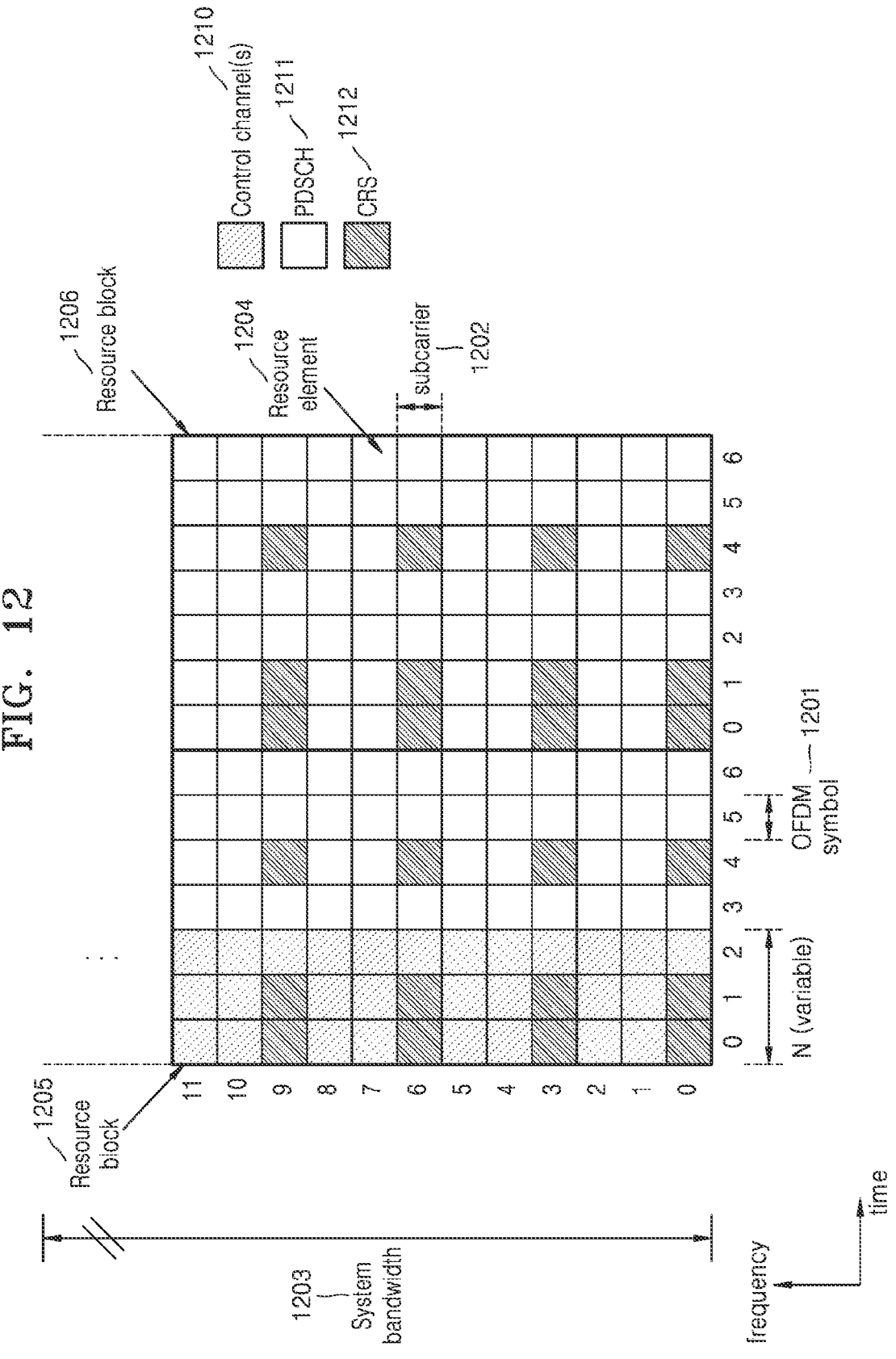
FIG. 12 illustrates a basic structure of a time-frequency resource domain for an LTE system.

Before describing avoidance of collision between LTE and 5G in the DSS system, a DL radio resource structure of an LTE system is described first with reference to FIG. 12.

FIG. 12 illustrates a basic structure of a time-frequency resource domain for an LTE system. That is, FIG. 12 shows a basic structure of a time-frequency domain, which is a radio resource region in which data or a control channel is transmitted on DL of an LTE system, and a mapping relationship for DL physical channels and signals.

The basic structure is basically similar to that for the 5G system described with reference to FIG. 1, but in LTE, unlike in the 5G system, a subcarrier spacing is generally fixed to 15 kHz irrespective of frequency bands, and there are control channels and signals that fixedly occupy time-frequency resources.

Referring to FIG. 12, the horizontal axis represents a time domain and the vertical axis represents a frequency domain. The smallest transmission unit in the time domain is an OFDM symbol 1201, a number of $$N_{symb}^{DL}$$

OFDM symbols (generally, $$N_{symb}^{DL} = 7)$$

may be grouped to form one slot, a number of two slots may be grouped to form one subframe having a length of 1 ms, and 10 subframes are grouped to form a radio frame having a length of 10 ms. The smallest transmission unit in the frequency domain is a subcarrier 1202, and an entire system bandwidth 1203 may be composed of a total of $N_{BW}$ subcarriers. $N_{BW}$ may have a value proportional to the entire system bandwidth. A basic resource unit in the time-frequency domain is a RE 1204 that may be represented by an OFDM symbol index and a subcarrier index. Each of RBs 2305 and 1206 (or physical RBs (PRBs)) may be defined as $$N_{symb}^{DL}$$

consecutive OFDM symbols in the time domain and $$N_{sc}^{RB}$$

consecutive sub-carriers (typically, $$N_{sc}^{RB} = 12)$$

in the frequency domain. Accordingly, one RB may consist of $$N_{symb}^{DL} \times N_{sc}^{RB}$$

REs.

An LTE DL control channel 1210 may be mapped within the first N OFDM symbols in a subframe in the time domain and mapped across the entire system bandwidth in the frequency domain for transmission to the UE. A time-frequency region to which the LIE DL control channel is mapped may be referred to as a "control region". The BS may vary a value of N for each subframe according to the amount of control information to be transmitted in a current subframe. In general, the value of N={1, 2, 3}. The PHICH may be mapped across OFDM symbols according to a separate configuration indicated by the BS within the N OFDM symbols. As the control channel, there may be a physical control format indicator channel (PCFICH) including an indicator indicating the value of N, a PDCCH including UL or DL scheduling information, and a physical HARQ indicator channel (PHICH) including an HARQ ACK/NACK signal indicating whether UL data has been successfully received. The PCFICH may be mapped to a first symbol among the first N OFDM symbols in the subframe, and the PDCCH may be mapped across the N OFDM symbols. The PHICH may be mapped across OFDM symbols according to a separate configuration indicated by the BS within the N OFDM symbols.

A PDSCH 1211 that is an LTE DL physical data channel may be mapped in the remainder of the subframe in which the DL control channel is not transmitted in the time domain and mapped to a frequency region indicated by the LTE PDCCH in the frequency domain for transmission to the UE.

The BS may transmit a reference signal (hereinafter referred to as a RS) to be used by the UE to measure a DL channel state or demodulate the PDSCH. A RS is also called a pilot signal RSs may be classified into a cell-specific reference signal (CRS) 1212 that may be jointly received by UEs in a cell, a CSI-RS that supports multiple antennas but uses fewer resources per antenna port than the CRS, and a demodulation reference signal (DMRS) that a UE uses to demodulate a PDSCH scheduled to the UE. For convenience, the CRS is shown in FIG. 12.

The DMRS for the PDSCH may be mapped to a predetermined location in a time-frequency domain for the PDSCH scheduled by the BS. In the case of the CSI-RS, the BS may control and operate a transmission periodicity and its mapping position in the time-frequency domain. On the other hand, the CRS is repeatedly mapped to REs illustrated in FIG. 12 and transmitted in every subframe across the entire system bandwidth.

An antenna port is a logical concept, and a RS is defined for each antenna port and is used to measure a channel state corresponding to each antenna port. If the same RS is transmitted from multiple physical antennas, the UE is not able to distinguish each physical antenna and recognizes them as a single antenna port.

The CRS is a cell common signal, and the UE may measure the CRS to perform the following operations.

1) The UE determines a DL channel state from the CRS and then reports the DL channel state to the BS to support BS scheduling.

2) The UE uses the CRS as a reference signal to demodulate a PDSCH received from the BS.

3) The UE determines whether a radio link between the BS and the UE is maintained above a certain threshold level.

4) The UE supports a handover decision by the BS by measuring a CRS from a neighboring cell and reporting it to the BS.

Therefore, regardless of whether PDSCH is transmitted to the UE within a subframe, the BS may transmit the CRS at a fixed position for every subframe.

As described above, due to the LTE "control region" and LTE CRS, which frequently occupy the time-frequency domain in the LTE system, a method for avoiding collision between LTE and 5G is required when transmitting 5G signals using DSS. Hereinafter, a method for avoiding collision between LTE and 5G signals in a DSS system is described with reference to FIG. 13.

Figure 13:
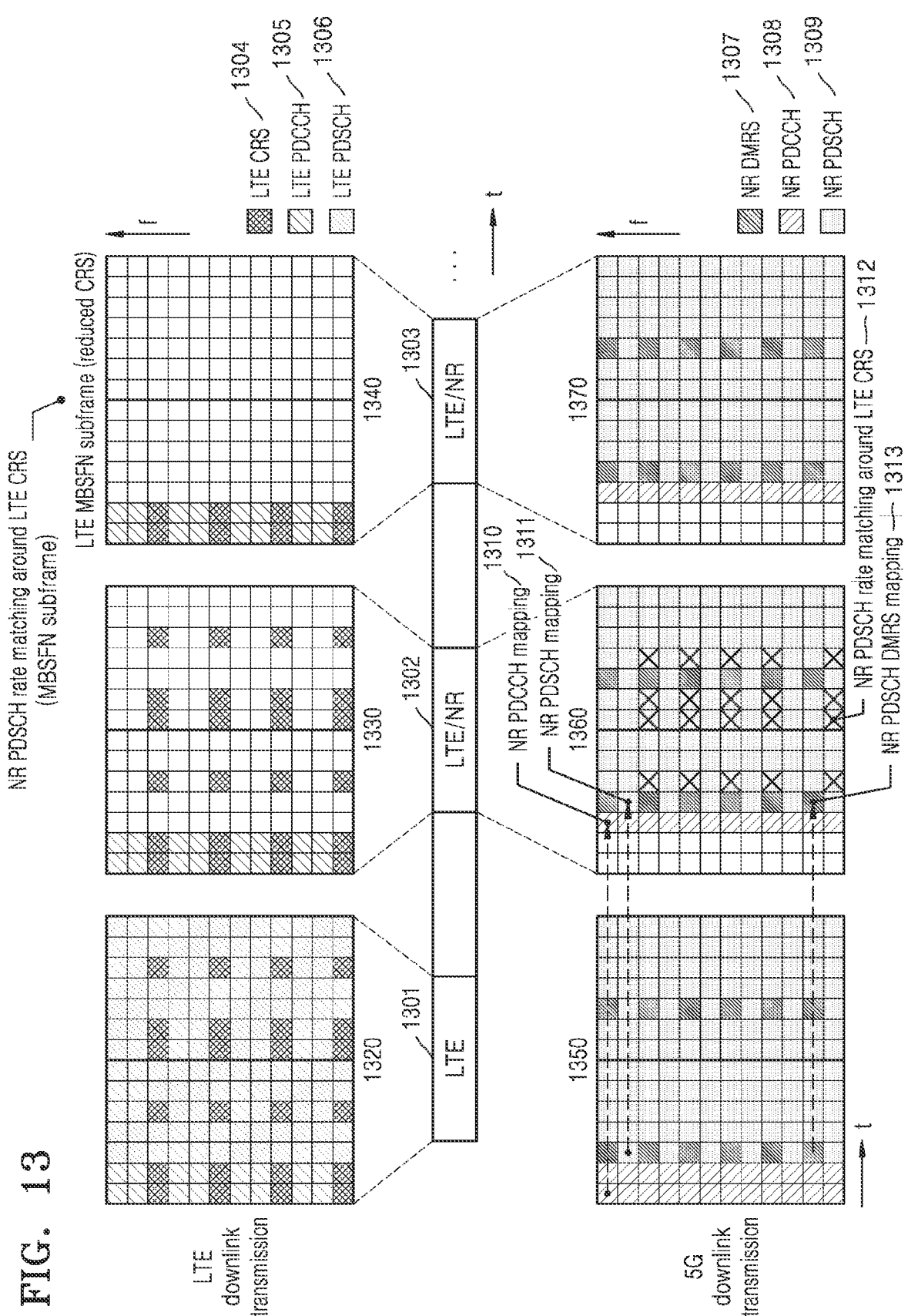
FIG. 13 is a diagram illustrating a method for avoiding collision between LTE and 5G signals in a dynamic spectrum sharing (DSS) system.

FIG. 13 is a diagram illustrating a method for avoiding collision between LTE and 5G signals in a DSS system.

Referring to FIG. 13, the horizontal axis represents a time domain and the vertical axis represents a frequency domain. In the example of FIG. 13, it is assumed that LTE and 5G systems use the same frequency bands and thus overlap each other in the frequency domain. It is also assumed that both LTE and 5G systems use the same subcarrier spacing of 15 kHz. For convenience of descriptions, channels/signals in the LTE system may be distinguished from channels/signals in the 5G systems by adding the word "LTE" to the channels/signals in the LTE system and "NR" to the channels/signals in the 5G system. For example, a PDCCH for LTE may be referred to as an LTE PDCCH, and a PDCCH for 5G may be referred to as an NR PDCCH. Reference numeral 1320 denotes the basic structure of a time-frequency domain for DL of the LTE system, as described with reference to FIG. 12, and indicates that a BS transmits an LTE DL signal during a time period 1301 (one subframe in LTE). The LTE DL signal may include an LTE CRS 1304, an LTE PDCCH 1305, and an LTE PDSCH 1306. The LTE PDCCH 1305 may include scheduling information for the LTE PDSCH 1306. In the structure 1320, the LTE "control region" occupying the first 2 symbols in the subframe is exemplified.

Reference numeral 1350 denotes a basic structure of a time-frequency domain for the 5G system, as described with reference to FIG. 1, in which an NR PDCCH 1308, an NR PDSCH 1309, and an NR DMRS 1307 for the NR PDSCH are mapped. In the structure 1350, the NR PDCCH 1308 may be mapped to the first two symbols in a slot, and the NR PDSCH 1309 scheduled by the NR PDCCH 1308 may be mapped in the remainder of the slot. In addition, the NR DMRS 1307 for the NR PDSCH 1309 may be mapped to third and tenth symbols within the slot.

In the example of FIG. 13, the BS may schedule and transmit the LTE PDSCH to an LTE UE during the time period 1301 according to the structure 1320. Referring to FIG. 13, there may be no signal transmitted by the BS to a 5G UE during the time period 1301. During time periods 1302 and 1303, the NR PDSCH 1309 may be scheduled and transmitted to the 5G UE according to structures 1360 and 1370, respectively. In addition, during the time periods 1302 and 1303, the BS may transmit the LTE CRS and the LTE PDCCH according to structures 1330 and 1340, respectively. In this case, there may be no LTE PDSCH transmission. Reference numeral 1340 denotes an LTE multimedia broadcast multicast service (MBMS) single frequency network (MBSFN) subframe, and the LTE MBSFN subframe 1340 has less overhead due to LTE CRS than that of general subframes in the structures 1320 and 1330.

1) LTE and 5G Signal Collision Avoidance Method 1: LTE CRS Rate Matching

In a DSS system, when transmitting a 5G DL signal to a 5G UE, the BS maps and transmits the 5G DL signal by avoiding a location of LTE CRS (LTE CRS rate matching). In addition, the BS informs the 5G UE of LTE CRS configuration information so that the 5G UE may receive the 5G DL signal at an accurate location. The LTE CRS configuration information may include the following pieces of information. The UE may know a mapping location of the LTE CRS from the LTE CRS configuration information.

v-Shift (0, 1, 2, 3, 4, 5): A mapping offset for LTE CRS from a RB boundary in the frequency domain, expressed in units of RE nrofCRS-Ports (1, 2, 4): Number of LTE CRS antenna ports carrierFreqDL (0 . . . 16383): A center frequency of an LTE carrier carrierBandwidthDL (6, 15, 25, 75, 100): LTE carrier bandwidth expressed in units of RB mbsfn-SubframeConfigList (period, offset): LTE MBSFN subframe configuration information including a configuration period and a timing offset of an LTE MBSFN subframe In the example of FIG. 13, when there is no DL data to be transmitted to the LTE UE by the BS during the time period 1302, or when the BS determines that scheduling for the 5G UE is prioritized, the BS may allocate available radio resources to the 5G UE. As described above, even when there is no LIE PDSCH to be transmitted to the LTE UE in a certain LTE subframe, the LTE system maps and transmits the LTE CRS at a predetermined location. Therefore, when the BS intends to provide a 5G service to the 5G UE during the time period 1302 (e.g., NR PDSCH transmission), the BS maps and transmits the NR PDSCH in time-frequency resources other than a mapping location of the LTE CRS. For example, a region 1312 indicated by 'x' represents REs in which the LTE CRS 1304 in the structure 1320 and 1330 is transmitted, and the BS maps and transmits the NR PDSCH in a region other than the corresponding REs. Because the UE needs to know the location of the LTE CRS to receive the NR PDSCH in a region other than the REs corresponding to the LTE CRS during reception, the UE obtains LTE CRS configuration information from the BS through signaling.

2) LTE and 5G Signal Collision Avoidance Method 2: NR PDCCH Mapping Adjustment

Time-frequency resources to which the NR PDCCH that is a DL control channel for the 5G system is mapped may be referred to as a control resource set (CORESET). A CORESET may be configured in all or some frequency resources within a bandwidth supported by the UE in the frequency domain. The CORESET may be configured in one or a plurality of OFDM symbols, which may be defined as a CORESET duration 404. The BS may configure the UE with one or a plurality of CORESETs via higher layer signaling (e.g., system information (SI), MIB, or RRC signaling), Configuring the UE with a CORESET means providing the UE with information such as a CORESET ID, a frequency location of the CORESET, a symbol length of the CORESET, etc. Pieces of information provided by the BS to the UE to configure a CORESET may include at least some of the following pieces of information included in Table 4.

TABLE 4

```
ControlResourceSet ::=              SEQUENCE {
   controlResourceSetId                ControlResourceSetId,
      (CORESET ID)
   frequencyDomainResources            BIT STRING (SIZE (45)),
      (frequency domain reources)
      duration                         INTEGER (1..maxCoReSetDuration),
      (CORESET duration)
   cce-REG-MappingType                 CHOICE {
      (CCE-to-REG mapping type)
      interleaved                      SEQUENCE {
         reg-BundleSize                ENUMERATED {n2, n3, n6},
                                       (REG bundle size)
                                       interleaverSize   ENUMERATED {n2, n3, n6},
                                       (interleaver size)
                                       shiftIndex    INTEGER(0..maxNrofPhysicalResourceBlocks−1)
OPTIONAL -- Need S
                                       (interleaver shift)
      },
      nonInterleaved                   NULL
   },
   precoderGranularity                 ENUMERATED {sameAsREG-bundle, allContiguousRBs},
      (precoding granularity)
         tci-StatesPDCCH-ToAddList             SEQUENCE(SIZE (1..maxNrofTCI-
StatesPDCCH)) OF TCI-StateId OPTIONAL, -- Cond NotSIB1-initialBWP
         (QCL configuration information)
   tci-StatesPDCCH-ToReleaseList SEQUENCE(SIZE (1..maxNrofTCI-StatesPDCCH))
OF TCI-StateId OPTIONAL, -- Cond NotSIB1-initialBWP
         (QCL configuration information)
   tci-PresentInDCI                    ENUMERATED {enabled}        OPTIONAL, --
Need S
         (QCL indicator configuration information in DCI)
   pdcch-DMRS-ScramblingID             INTEGER (0..65535)          OPTIONAL, --
Need S
         (PDCCH DMRS scrambling ID)
}
```

A CORESET may consist of $$N_{RB}^{CORESET}$$

RBs in the frequency domain and $$N_{symb}^{CORESET} \in \{1, 2, 3\}$$

symbols in the time domain. The NR PDCCH may consist of one or a plurality of control channel elements (CCEs). A CCE may consist of 6 resource element groups (REGs), and a REG may be defined as 1 RB in one OFDM symbol. In a CORESET, REGs may be indexed in a time-first manner starting at REG index 0 for a first OFDM symbol and a lowest-numbered RB in the CORESET.

5G supports an interleaved method and a non-interleaved method as a transmission method for the NR PDCCH. The BS may configure, via higher layer signaling, the UE with whether a transmission type is interleaved or non-interleaved for each CORESET. Interleaving may be performed in units of REG bundles. A REG bundle may be defined as a set of one or a plurality of REGs. The UE may determine a CCE-to-REG mapping type for a corresponding CORE-SET in a manner as shown in Table 5 below, based on whether the transmission type is interleaved or non-interleaved as configured by the BS,

TABLE 5

The CCE-to-REG mapping for a control-resource set can be interleaved or non-interleaved and is described by REG bundles:
- REG bundle i is defined as REGs {iL,iL + 1,...,iL + L − 1} where L is the REG bundle size, i = 0,1, ... , $N_{REG}^{CORESET}/L$ − 1, and $N_{REG}^{CORESET} = N_{RB}^{CORESET}N_{symb}^{CORESET}$ is the number of REGs in the CORESET
- CCE j consists of REG bundles {f(6j/L), f(6j/L + 1),..., f(6j/L + 6/L − 1)} where f(•) is an interleave
r For non-interleaved CCE-to-REG mapping, L = 6 and f(x) = x.
For interleaved CCE-to-REG mapping, L ∈ {2,6}for $N_{symb}^{CORESET}$ = 1 and L ∈ {$N_{symb}^{CORESET}$, 6} for $N_{symb}^{CORESET}$ ∈ {2,3}. Th
e interleaver is defined by $$f(x) = (rC + c + n_{shift}) \bmod (N_{REG}^{CORESET}/L)$$
$$x = cR + r$$
$$r = 0,1, ... , R − 1$$
$$c = 0,1, ... , C − 1$$
$$C = N_{REG}^{CORESET}/(LR)$$

where R ∈ {2,3,6} .

In the 5G system, the BS may inform, via signaling, the UE of configuration information such as symbols to which the NR PDCCH is mapped in a slot, a transmission period-icity, etc.

In the example of FIG. 13, in the structure 1350, the NR PDCCH 1308 may be mapped to the first two symbols in a slot and transmitted. During the time period 1302 when LTE and 5G coexist, the NR PDCCH may be mapped to a third symbol in a slot (1310) by avoiding time-frequency resources occupied by the LTE PDCCH and the LTE CRS according to the structure 1360, thereby avoiding a collision between the LTE and 5G.

3) LTE and 5G Signal Collision Avoidance Method 3: Adjustment of Location of DMRS for NR PDSCH In the 5G system, the BS configures a mapping location of DMRS for NR PDSCH and informs the UE about the mapping location via signaling. For example, in the structure 1350 of FIG. 13, the DMRS for NR PDSCH may be mapped to the third and tenth symbols in the slot. During the time period 1302 when the LTE and 5G coexist, the DMRS for NR PDSCH may be mapped to fourth and tenth symbols in the slot (1313) by avoiding time-frequency resources occupied by the LTE PDCCH and the LTE CRS according to the structure 1360, thereby avoiding a collision between the LTE and 5G.

4) LTE and 5G Signal Collision Avoidance Method 4: NR PDSCH Mapping Adjustment

In the 5G system, the BS informs the UE of time-frequency resource information of the NR PDSCH via the NR PDCCH scheduling the NR PDSCH.

For example, in the case of the structure 1350 of FIG. 13, the NR PDSCH may be mapped to third through fourteenth symbols in the slot. During the time period 1302 when the LTE and 5G coexist, the NR PDSCH may be mapped to the fourth through fourteenth symbols in the slot (1311) by avoiding the time-frequency resources occupied by the LTE PDCCH according to the structure 1360, thereby avoiding a collision between the LTE and 5G. A collision between the NR PDSCH and the LTE CRS may be avoided using the LTE and 5G signal collision avoidance method 1.

5) LTE and 5G Signal Collision Avoidance Method 5: LTE MBSFN Subframe Adjustment By configuring MBSFN in a certain subframe in the LTE system (LTE MBSFN subframe), the frequency of LTE CRS mapping within the LTE MBSFN subframe may be lowered, and a size of a time domain of an LTE "control region" may be limited. For example, an LTE CRS mapping symbol in the LTE MBSFN subframe may be limited to the first one or two symbols within the subframe, and the size of the time domain of the LTE "control region" in the LTE MBSFN subframe may be limited to a maximum of first two symbols within the subframe. Reference number 1340 illustrates a structure in which the time period 1303 is configured as an LTE MBSFN subframe for the LTE system. Therefore, for the coexistence of LTE and 5G in the time period 1303, a 5G signal has only to be mapped in such a manner as to avoid LTE CRS and the LTE "control region" mapped across the first two symbols in the LTE MBSFN subframe. That is, a collision between the LTE and 5G signals may be avoided by mapping the NR PDCCH to the third symbol in the slot by avoiding time-frequency resources occupied by the LTE PDCCH, mapping the DMRS for NR PDSCH to the fourth and tenth symbols in the slot, and mapping the NR PDSCH to the fourth through fourteenth symbols in the slot according to the structure 1370.

6) LTE and 5G Signal Collision Avoidance Method 6: 5G UL Transmission Frequency Shift Unless there is a separate configuration, frequency domain mapping of a 5G UL signal is misaligned with frequency domain mapping of an LTE UL signal by half a subcarrier spacing based on the subcarrier spacing of 15 kHz, Therefore, for coexistence of LTE and 5G signals in UL during the time periods 1302 and 1303 of FIG. 13, the frequency domain mapping of the 5G UL signal may be mapped by being shifted as much as half the subcarrier spacing (=7.5 kHz). The BS notifies the UE via signaling that the mapping of the UL signal is shifted by 7.5 kHz in the frequency domain.

Because the DSS system is a mechanism that allows LTE and 5G to share time-frequency resources, if there is an excessively large volume of 5G traffic, a scheduling constraint may occur due to insufficient radio resources for scheduling an LTE UE. On the other hand, when there is an excessively large volume of LTE traffic, a scheduling constraint may occur due to insufficient radio resources for scheduling a 5G UE. In particular, due to limitation of NR PDCCH resource mapping, radio resources for the NR PDCCH may be relatively insufficient compared to the NR PDSCH.

Hereinafter, in order to overcome scheduling constraints for a 5G UE, a method used by a 5G cell to perform cross-carrier scheduling for a cell implementing DSS (hereinafter called a DSS cell for convenience of descriptions) after applying 5G CA (carrier aggregation) to the 5G cell and the DSS cell is described through a specific embodiment of the present disclosure.

First Embodiment

The first embodiment describes a method of configuring a search space for an NR PDCCH when a DSS cell and a 5G cell are aggregated using CA and the 5G cell performs cross-carrier scheduling for the DSS cell.

First, the search space for the NR PDCCH is described as follows. The number of CCEs required to transmit an NR PDCCH may be 1, 2, 4, 8, or 16 depending on an aggregation level (AL), and a different number of CCEs may be used to implement link adaptation of a DL control channel. For example, when AL=L, one DL control channel may be transmitted using L CCEs. The UE may perform blind decoding for detecting a signal as it does not know information about a DL control channel, and a search space representing a set of CCEs may be defined for the blind decoding. The search space is a set of DL control channel candidates, each candidate being composed of CCEs, intended for the UE to attempt to decode at a given AL, and because there are various ALs respectively corresponding to sets of 1, 2, 4, 8, and 16 CCEs, the UE may have a plurality of search spaces, A search space set may be defined as a set of search spaces at all configured ALs.

The search space may be classified into a common search space (CSS) and a UE-specific search space (USS). A certain group of UEs or all UEs may monitor a CSS for an NR PDCCH in order to receive cell-common control information such as dynamic scheduling of system information (SIB) or paging messages. For example, the UE may receive scheduling allocation information for an NR PDSCH for receiving the system information, by monitoring the CSS for the NR PDCCH. For the CSS, because a certain group of UEs or all UEs need to receive an NR PDCCH, the CSS may be defined as a predetermined set of CCEs. The UE may receive scheduling allocation information for UE-specific NR PDSCH or NR PUSCH, by monitoring a USS for an NR PDCCH. A USS may be defined in a UE-specific manner, based on an ID of the UE and a function of various system parameters.

In the 5G system, the BS may configure the UE with configuration information for a search space for an NR PDCCH via higher layer signaling (e g, SIB, MIB, RRC signaling). For example, the BS may configure the UE with the number of NR PDCCH candidates at each AL L, a monitoring periodicity for a search space, monitoring occasions in symbols within slots for the search space, a search space type (a CSS or a USS), a combination of DCI format and RNTI to be monitored in the search space, and an index of a CORESET in which the search space is to be monitored. For example, parameters for the search space for the NR PDCCH may include the pieces of information as listed in Table 6 below.

TABLE 6

```
SearchSpace ::=                          SEQUENCE {
    searchSpaceId                        SearchSpaceId,
        (search space ID)
    controlResourceSetId                 ControlResourceSetId           OPTIONAL, -- Cond
SetupOnly
        (CORESET ID)
    monitoringSlotPeriodicityAndOffset CHOICE {
        (monitoring slot periodicity and offset)
        sl1                              NULL,
        sl2                              INTEGER (0..1),
        sl4                              INTEGER (0..3),
        sl5                              INTEGER (0..4),
        sl8                              INTEGER (0..7),
        sl10                             INTEGER (0..9),
        sl16                             INTEGER (0..15),
        sl20                             INTEGER (0..19),
        sl40                             INTEGER (0..39),
        sl80                             INTEGER (0..79),
        sl160                            INTEGER (0..159),
        sl320                            INTEGER (0..319),
        sl640                            INTEGER (0..639),
        sl1280                           INTEGER (0..1279),
        sl2560                           INTEGER (0..2559)
    }                                                OPTIONAL, -- Cond Setup
    duration                             INTEGER (2..2559)              OPTIONAL, -- Need
R
        (monitoring duration)
    monitoringSymbolsWithinSlot          BIT STRING (SIZE (14))         OPTIONAL, -
- Cond Setup
        (location of monitoring symbols within slot)
    nrofCandidates                       SEQUENCE {
        (number of PDCCH candidates per aggregation level)
        aggregationLevel1                ENUMERATED {n0, n1, n2, n3, n4, n5, n6, n8},
        aggregationLevel2                ENUMERATED {n0, n1, n2, n3, n4, n5, n6, n8},
        aggregationLevel4                ENUMERATED {n0, n1, n2, n3, n4, n5, n6, n8},
        aggregationLevel5                ENUMERATED {n0, n1, n2, n3, n4, n5, n6, n8},
        aggregationLevel16               ENUMERATED {n0, n1, n2, n3, n4, n5, n6, n8}
    }                                                OPTIONAL, -- Cond Setup
    searchSpaceType                      CHOICE {
        (search space type)
        common                           SEQUENCE {
            (common search space)
            dci-Format0-0-AndFormat1-0       SEQUENCE {
                ...
            }                                        OPTIONAL, -- Need R
            dci-Format2-0                SEQUENCE {
                nrofCandidates-SFI           SEQUENCE {
                    aggregationLevel1            ENUMERATED {n1, n2}       OPTIONAL, --
Need R
                    aggregationLevel2            ENUMERATED {n1, n2}       OPTIONAL, --
Need R
                    aggregationLevel4            ENUMERATED {n1, n2}       OPTIONAL, --
Need R
                    aggregationLevel5            ENUMERATED {n1, n2}       OPTIONAL, --
Need R
                    aggregationLevel16           ENUMERATED {n1, n2}       OPTIONAL --
Need R
                },
                ...
            }                                        OPTIONAL, -- Need R
            dci-Format2-1                SEQUENCE {
                ...
            }                                        OPTIONAL, -- Need R
            dci-Format2-2                SEQUENCE {
                ...
            }                                        OPTIONAL, -- Need R
            dci-Format2-3                SEQUENCE {
                dummy1                       ENUMERATED {sl1, sl2, sl4, sl5, sl8, sl10, sl16, sl20}
OPTIONAL, -- Cond Setup
                dummy2                       ENUMERATED {n1, n2},
                ...
            }                                        OPTIONAL -- Need R
        },
```

TABLE 6-continued

| | |
|---|---|
| ue-Specific | SEQUENCE { |
| (UE-specific search space) | |
| dci-Formats | ENUMERATED {formats0-0-And-1-0, formats0-1-And-1-1}, |
| ..., | |
| } | |
| } | OPTIONAL -- Cond Setup2 |
| } | |

According to the configuration information, the BS may configure the UE with one or a plurality of search space sets. According to some embodiments, the BS may configure the UE with search space set 1 and search space set 2. For the search space set 1, the UE may be configured to monitor in a CSS for a DCI format A scrambled with X-RNTI, and for the search space set 2, the UE may be configured to monitor in a USS for a DCI format B scrambled with Y-RNTI.

According to the configuration information, one or a plurality of search space sets may exist in the CSS or USS. For example, search space set #1 and search space set #2 may be configured as the CSS, and search space set #3 and search space set #4 may be configured as the USS.

The UE may monitor in the CSS for the following combinations of DCI formats and RNTIs. However, the combinations are not limited to an example set forth below.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI The UE may monitor in the USS for the following combinations of DCI formats and RNTIs. However, the combinations are not limited to an example set forth below.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The above RNTIs may comply with the following definitions and uses.

Cell RNTI (C-RNTI): used for scheduling a UE-specific PDSCH or PUSCH

Temporary Cell RNTI (TC-RNTI): used for scheduling a UE-specific PDSCH.

Configured Scheduling RNTI (CS-RNTI): used for scheduling a semi-statically configured UE-specific PDSCH Random Access RNTI (RA-RANTI): used for scheduling a PDSCH during a random access procedure Paging RNTI (P-RNTI): used for scheduling a PDSCH on which paging information is transmitted System Information RNTI (SI-RNTI): used for scheduling a PDSCH on which SI is transmitted Interruption RNTI (INT-RNTI): used for notifying whether to puncture a PDSCH Transmit Power Control for PUSCH RNTI (TPC-PUSCH-RNTI): used for indicating a power control command for a PUSCH Transmit Power Control for PUCCH RNTI (TPC-PUCCH-RNTI): used for indicating a power control command for a PUCCH Transmit Power Control for Sounding Reference Signal RNTI (TPC-SRS-RNTI): for indicating a power control command for SRS The DCI formats specified above may be defined as shown in Table 7 below.

TABLE 7

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, a search space at an aggregation level L in a CORESET p and a search space set s may be expressed by Equation (1) below:

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \qquad \text{[Equation 1]}$$

L: aggregation level $n_{CI}$: carrier index $N_{CCE,p}$: total number of CCEs in CORESET p $n_{s,f}^{\mu}$: slot index $M_{p,s,max}^{(L)}$: number of PDCCH candidates at aggregation level L $m_{snCI}=0, \ldots, M_{p,s,max}^{(L)}-1$: indexes of PDCCH candidates at aggregation level L $i=0, \ldots, L-1$ $Y_{p,n_{s,f}^{\mu}}=A_p \cdot Y_{p,n_{s,f}^{\mu}}) \bmod D$, $Y_{p-1}=n_{RNTI}\neq0$, $A_0=39827$, $A_1=39829$, $A_2=39839$, D=65537

$n_{RNTI}$: UE ID

For CSS, $$Y_{p,n_{s,f}^{\mu}}$$

value may correspond to 0.

For USS, $$Y_{p,n_{s,f}^{\mu}}$$

value may correspond to a value that vanes according to a UE ID (C-RNTI or ID configured by BS for UE) and a time index.

Hereinafter, a method of configuring a search space for an NR PDCCH and an operation of a UE when a DSS cell and a 5G cell are aggregated together using CA and then the 5G cell (SCell) performs cross-carrier scheduling for the DSS cell (PCell), which is the key feature of the first embodiment, are described with reference to FIGS. 14 through 20. In examples of FIGS. 14, 15, 17, and 19, relationships representing whether a cell where a CSS and a USS of an NR PDCCH scheduling NR PDSCH/NR PUSCH are assigned is a PCell or an SCell may be indicated by arrows. In the first embodiment, it is assumed that a 5G UE connects to a DSS cell via an initial access to recognize the DSS cell as a PCell and thereafter additionally configure a 5G cell as an SCell.

Figure 14:
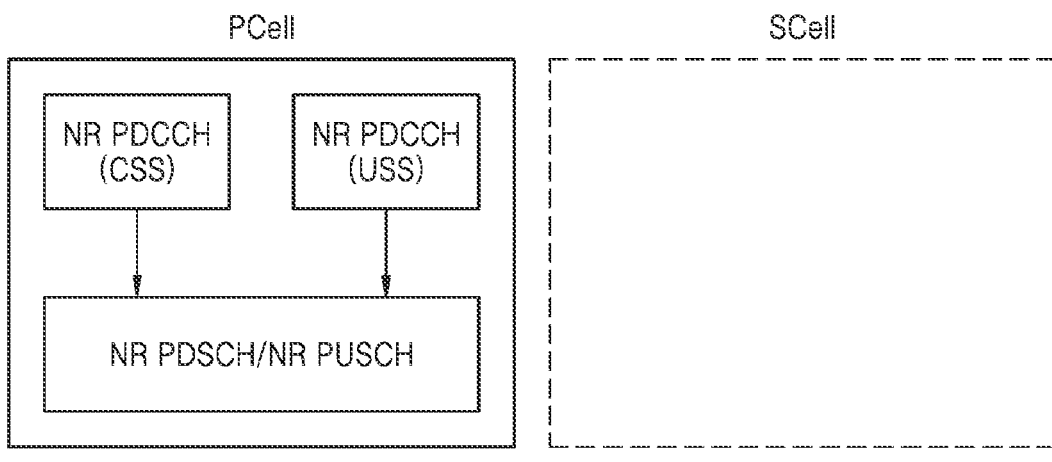
FIG. 14 illustrates a search space after an initial access by a user equipment (UE) in a wireless communication system, according to an embodiment of the present disclosure.

FIG. 14 illustrates search spaces after an initial access by the UE in a wireless communication system, according to an embodiment of the present disclosure. For example, FIG. 14 shows an example in which a 5G UE connects to a DSS cell (a PCell) through an initial access and configures a CSS and a USS within the DSS cell, FIG. 14 shows a state in which there is no search space for the SCell because the SCell has not yet been additionally configured.

Figure 15:
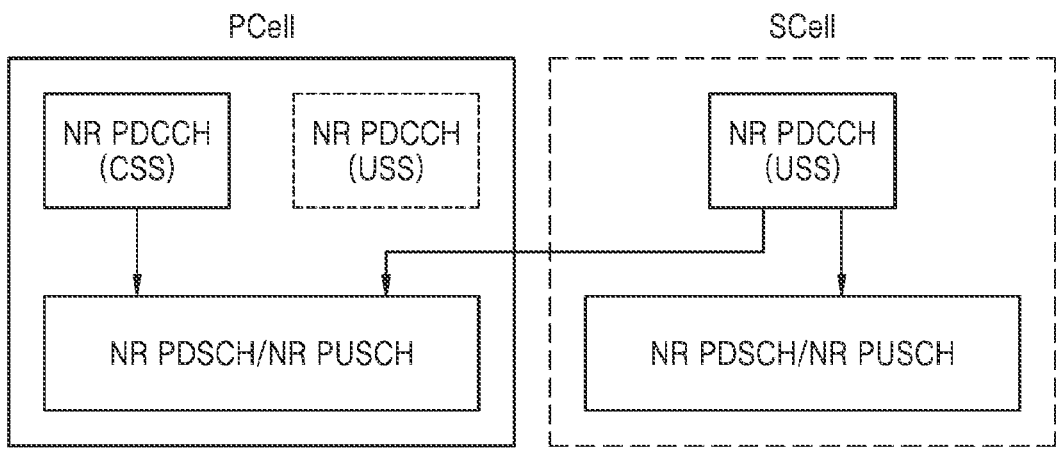
FIG. 15 is a diagram illustrating a method of configuring a new radio (NR) physical downlink control channel (PDCCH) search space in a wireless communication system, according to an embodiment of the present disclosure.
Figure 16:
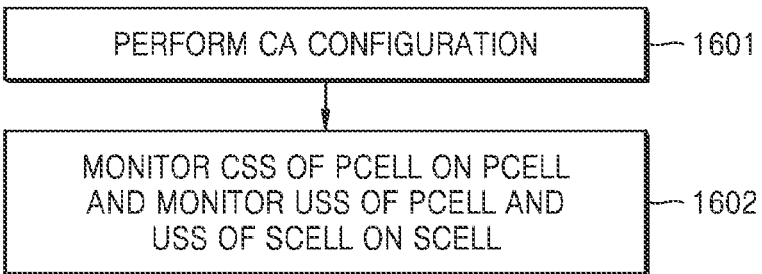
FIG. 16 is a flowchart of a method, performed by a UE, of monitoring an NR PDCCH search space in a wireless communication system, according to an embodiment of the present disclosure.

NR PDCCH Search Space Configuration Method 1 (in which a CSS and a USS of an NR PDCCH for Scheduling a PCell (a DSS Cell) are Separately Assigned to the PCell and an SCell, Respectively):

FIG. 15 is a diagram illustrating a method of configuring an NR PDCCH search space in a wireless communication system, according to an embodiment of the present disclosure, That is, FIG. 15 illustrates an NR PDCCH search space configuration method 1. As described above, because a CSS is used for scheduling system information or paging messages, it is desirable that the CSS is assigned to the PCell for operation. Therefore, in the first embodiment, even though the SCell performs cross-carrier scheduling for the PCell, the CSS for the PCell may be still assigned to the PCell (i.e., the DSS cell). On the other hand, because the USS for the PCell may be moved to the SCell, a shortage of radio resources for NR PDCCH in the DSS cell (PCell) may be solved. A configuration for the USS of the PCell that is moved to the SCell and a CORESET configuration therefor may respectively follow a configuration for a search space of the SCell and a CORESET configuration therefor. Thus, the USS for the PCell no longer exists in the PCell. FIG. 16 is a flowchart of a method, performed by a UE, of monitoring an NR PDCCH search space in a wireless communication system, according to an embodiment of the present disclosure. In other words, FIG. 16 shows a procedure for the UE monitoring an NR PDCCH according to the NR PDDCH search space configuration method 1. In operation 1601, the UE receives an indication of CA configuration from a BS. The CA configuration may include a configuration in which an SCell performs cross-carrier scheduling for a PCell. When the UE completes the CA configuration according to the indication by the BS, the UE may perform NR PDCCH monitoring in operation 1602. For example, according to the NR PDCCH search space configuration method 1, the UE may monitor a CSS for the PCell on the PCell and monitor both a USS for the PCell and a USS for the SCell on the SCell. A configuration for the USS of the PCell monitored by the UE on the SCell and a CORESET configuration therefor may respectively follow a configuration for the USS of the SCell and a CORESET configuration therefor. In a subsequent operation, the UE may receive an NR PDSCH or transmit an NR PUSCH according to scheduling by the successfully received NR PDCCH.

Figure 17:
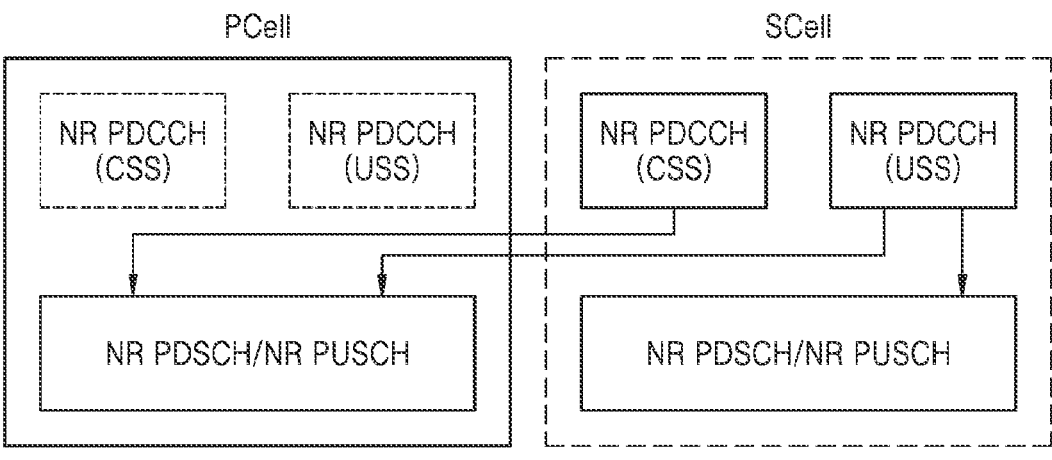
FIG. 17 is a diagram illustrating another method of configuring an NR PDCCH search space in a wireless communication system, according to an embodiment of the present disclosure.

NR PDCCH Search Space Configuration Method 2 (in which a CSS and a USS of an NR PDCCH for Scheduling a PCell (a DSS Cell) are not Separately Assigned but are Both Assigned to an SCell):

FIG. 17 is a diagram illustrating another method of configuring an NR PDCCH search space in a wireless communication system, according to an embodiment of the present disclosure. In other words, FIG. 17 illustrates the NR PDCCH search space configuration method 2. The NR PDCCH search space configuration method 2 may solve the above-described problem of shortage of radio resources for NR PDCCH within the DSS cell (the PCell) by moving both the CSS and the USS for the PCell to the SCell regardless of whether a search space for the PCell is a CSS or a USS. A configuration for search spaces of the PCell moved to the SCell and a CORESET configuration therefor may respectively follow a configuration for a search space of the SCell and a CORESET configuration therefor. Accordingly, the search spaces for the PCell may no longer exist in the PCell. Compared to the NR PDCCH search space configuration method 1, the NR PDCCH search space configuration method 2 may more actively solve the shortage of NR PDCCH radio resources in the DSS cell (PCell).

Figure 18:
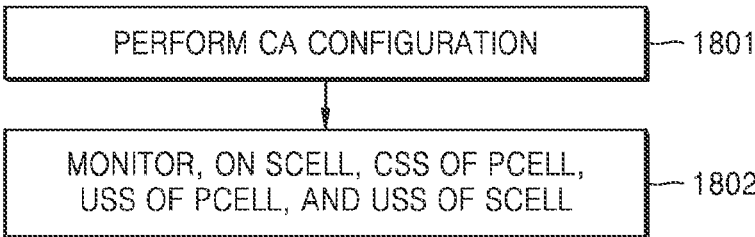
FIG. 18 is a flowchart of another method, performed by a UE, of monitoring an NR PDCCH search space in a wireless communication system, according to an embodiment of the present disclosure.

FIG. 18 is a flowchart of another method, performed by a UE, of monitoring an NR PDCCH search space in a wireless communication system, according to an embodiment of the present disclosure. In other words, FIG. 18 shows a procedure for the UE monitoring an NR PDCCH according to the NR PDDCH search space configuration method 2. In operation 1801, the UE receives an indication of CA configuration from a BS. The CA configuration may include a configuration in which an SCell performs cross-carrier scheduling for a PCell. When the UE completes the CA configuration according to the indication by the BS, the UE may perform NR PDCCH monitoring in operation 1802. According to the NR PDCCH search space configuration method 2, the UE may monitor, on the SCell, a CSS for the PCell, a USS for the PCell, and a USS for the SCell. A configuration for the search spaces of the PCell monitored by the UE on the SCell and a CORESET configuration therefor may respectively follow a configuration for the USS of the SCell and a CORESET configuration therefor. In a subsequent operation, the UE may receive an NR PDSCH or transmit an NR PUSCH according to scheduling by the successfully received NR PDCCH.

Figure 19:
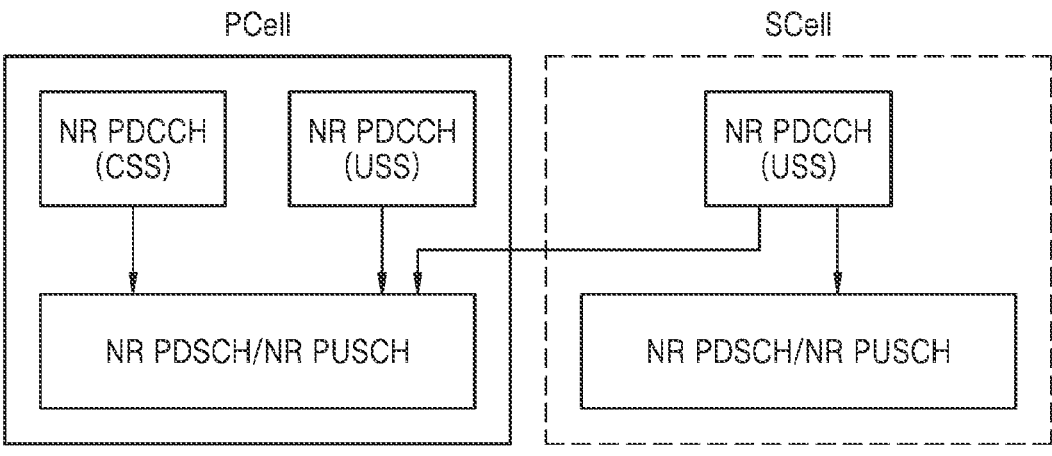
FIG. 19 is a diagram illustrating another method of configuring an NR PDCCH search space in a wireless communication system, according to an embodiment of the present disclosure.

NR PDCCH Search Space Configuration Method 3 (in which a CSS and a USS of an NR PDCCH for Scheduling a PCell (a DSS Cell) are Assigned to the PCell and a USS of the NR PDCCH for Scheduling the PCell are Additionally Assigned to an SCell):

FIG. 19 is a diagram illustrating another method of configuring an NR PDCCH search space in a wireless communication system, according to an embodiment of the present disclosure. In other words, FIG. 18 illustrates the NR PDCCH search space configuration method 3. The NR PDCCH search space configuration method 3 may include a method of additionally configuring a USS for the PCell on the SCell while maintaining the CSS for the PCell and the USS for the PCell in the same state as before CA is applied. A configuration for the USS of the PCell additionally configured in the SCell and a CORESET configuration therefor may respectively follow a configuration for a search space of the SCell and a CORESET configuration therefor. In the NR PDCCH search space configuration method 3, the USS for the PCell may be assigned to both the PCell and the SCell so that even if a radio link of either one of the PCell and the SCell is unstable, an NR PDCCH for the PCell may be transmitted using a search space for the other cell with a stable radio link.

Figure 20:
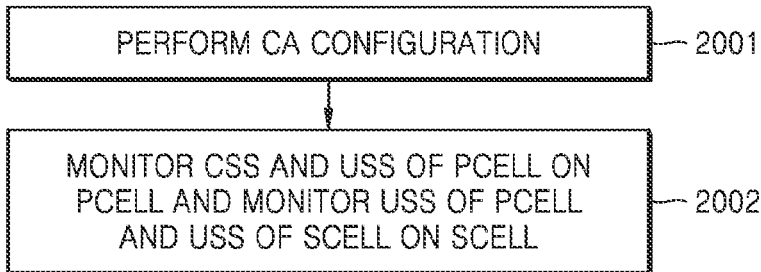
FIG. 20 is a flowchart of another method, performed by a UE, of monitoring an NR PDCCH search space in a wireless communication system, according to an embodiment of the present disclosure.

FIG. 20 is a flowchart of another method, performed by a UE, of monitoring an NR PDCCH search space in a wireless communication system, according to an embodiment of the present disclosure. In other words, FIG. 20 shows a procedure for the UE monitoring an NR PDCCH according to the NR PDDCH search space configuration method 3. In operation 2001, the UE receives an indication of CA configuration from a BS. The CA configuration may include a configuration in which an SCell performs cross-carrier scheduling for a PCell. When the UE completes the CA configuration according to the indication by the BS, the UE may perform NR PDCCH monitoring in operation 2002. According to the NR PDCCH search space configuration method 3, the UE may monitor a CSS and a USS for the PCell on the PCell and monitor the USS for the PCell and a USS for the SCell on the SCell. A configuration for the search space of the PCell monitored by the UE on the SCell and a CORESET configuration therefor may respectively follow a configuration for the USS of the SCell and a CORESET configuration therefor. In a subsequent operation, the UE may receive an NR PDSCH or transmit an NR PUSCH according to scheduling by the successfully received NR PDCCH.

Various modifications may be made to the NR PDCCH search space configuration methods 1, 2, and 3. For example, a configuration for a search space of the PCell monitored by the UE on the SCell and a CORESET configuration therefor may be implemented using various methods as set forth below.

Method 1 of configuring a search space and a CORESET for the PCell in the SCell: A configuration for the search space of the PCell monitored by the UE on the SCell and a CORESET configuration therefor respectively follow a configuration for the USS of the SCell and a CORESET configuration therefor in the same manner.

Method 2 of configuring a search space and a CORESET for the PCell in the SCell: A configuration for the search space of the PCell monitored by the UE on the SCell and a CORESET configuration therefor respectively have offsets relative to a configuration for the USS of the SCell and a CORESET configuration therefor. The UE may be informed of the offsets by the BS via signaling.

Method 3 of configuring a search space and a CORESET for the PCell in the SCell: A configuration for the search space of the PCell monitored by the UE on the SCell and a CORESET configuration therefor are separate configurations respectively independent of a configuration for the USS of the SCell and a CORESET configuration therefor. Therefore, the BS informs, via signaling, the UE of the configuration of the search space for the PCell monitored by the UE on the SCell and its associated CORESET configuration.

Method 4 of configuring a search space and a CORESET for the PCell in the SCell: The BS informs, via signaling, the UE of which method to use among the methods 1, 2, and 3 of configuring the search space and CORESET for the PCell in the SCell.

The NR PDCCH search space configuration method 2 may be understood as a concept of "PCell change (PCell switch)" in which an existing PCell is switched to an SCell and a newly added SCell is switched to the PCell by configuring CA for the UE. In this case, from a UL perspective, the UE may transmit a PUCCH for transmitting UCI to the BS on the newly switched PCell.

In the NR PDCCH search space configuration methods 1 and 3 in which the search space for the PCell exists on both the PCell and the SCell, an additional procedure related to an HARQ operation for an NR PDSCH/an NR PUSCH on the PCell may be required. For example, an NR PDCCH for scheduling initial transmission of the NR PDSCH on the PCell may be mapped to a search space for the PCell on the SCell and transmitted, and an NR PDCCH for scheduling retransmission of the NR PDSCH on the PCell may be mapped to a search space for the PCell on the PCell and transmitted (or vice versa).

If the operation described above is allowed, the BS may set an HARQ process ID in control information of the NR PDCCH for scheduling the initial transmission to the same value as an HARQ process ID for the NR PDCCH for scheduling the retransmission, thereby informing the UE of scheduling for the same NR PDSCH (or NR PUSCH).

If the operation described above is not allowed, the BS maintains a cell that has mapped and transmitted the NR PDCCH for scheduling the initial transmission to be the same as a cell that has transmitted and mapped the NR PDCCH for scheduling the retransmission, Therefore, the UE expects that the NR PDCCH scheduling the same NR PDSCH (or NR PUSCH) will be transmitted on the same cell regardless of initial transmission or retransmission, and if they are not transmitted on the same cell, the UE may recognize this as an error situation.

In the NR PDCCH search space configuration methods 1 and 3 in which the CSS for the PCell and the USS for the PCell exist separately on the PCell and the SCell, the following operation may be defined according to whether the NR PDCCH mapped to the USS and transmitted may be mapped to the CSS as well. In addition, when CA is not configured, by allowing the operation described above, the amount of radio resources occupied by a search space may be managed to prevent an excessive amount of the radio resources from being occupied by the search space When the mapping of the NR PDCCH mapped to the USS and transmitted to the CSS as well is allowed: the degrees of freedom in NR PDCCH mapping at the BS may be increased.

When the mapping of the NR PDCCH mapped to the USS and transmitted to the CSS is not allowed: the complexity of NR PDCCH reception by the UE may be reduced. In order to support this type of operation, if the BS configures cross-carrier scheduling for the PCell through CA, the UE expects that the NR PDCCH mapped to the USS and transmitted is not mapped to the CSS. On the other hand, if the BS does not configure CA or cross-carrier scheduling for the PCell, the UE expects that the NR PDCCH mapped to the USS and transmitted may also be mapped to the CSS.

Second Embodiment

In the second embodiment, when a DSS cell and a 5G cell are aggregated together using 5G CA and the 5G cell performs cross-carrier scheduling for the DSS cell, a quasi co-location (QCL) relationship of an NR PDCCH for each cell is defined.

First, a method of configuring a transmission configuration indication (TCI) state for the NR PDCCH (or NR PDCCH DMRS) in the 5G system is described in detail.

The BS may configure and indicate a TCI state for the NR PDCCH (or NR PDCCH DMRS) via appropriate signaling. The TCI state is for notifying a QCL relationship between an NR PDCCH (or NR PDCCH DMRS) and another RS or channel, and when a reference antenna port A (reference RS #A) is QCLed with another target antenna port B (target RS #B), it may be understood that the UE is allowed to apply all or some of large-scale channel parameters estimated from the antenna port A to channel estimation from the antenna port B. QCL may be required to associate different parameters according to situations such as 1) time tracking affected by average delay and delay spread, 2) frequency tracking affected by Doppler shift and Doppler spread, 3) radio resource management (RRM) affected by average gain, and 4) beam management (BM) affected by a spatial parameter. Accordingly, 5G may support four types of QCL relationships as shown in Table 8 below.

TABLE 8

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may collectively refer to some or all of various parameters such as angle of arrival (AoA), power angular spectrum (PAS) of AoA, angle of departure (AoD), PAS of AoD, transmit/receive channel correlation, transmit/receive beamforming, spatial channel correlation, etc.

The QCL relationship may be configured for the UE via TCI-State and QCL-Info, which are RRC parameters, as shown in Table 9 below. Referring to Table 9, the BS may configure the UE with one or more TCI states to inform the UE of a maximum of two QCL relationships (qcl-Type1 and qcl-Type2) for a RS containing a reference to an ID of the TCI state, i.e., a target RS. In this case, each piece of QCL information QCL-info included in the TCL state may include a serving cell index and a bandwidth part (BWP) index of a reference RS indicated by the corresponding QCL information, a type and an ID of the reference RS, and a QCL type as shown in Table 8 above The 5G system may support a hierarchical signaling method for dynamic assignment for a PDCCH beam. The BS may configure, via RRC signaling, the UE with N TCI states, some of which may be configured as TCI states for a CORESET. Thereafter, the BS may indicate to the UE one of the TCI states for the CORESET via MAC CE signaling. The UE may receive a PDCCH based on beam information in the TCI state indicated via the MAC CE signaling.

TCI indication MAC CE signaling for the NR PDCCH DMRS may consist of 2 bytes (16 bits) in length and may include a reserved bit of 1 bit, a serving cell ID of 5 bits, a BWP ID of 2 bits, a CORESET ID of 2 bits, and a TCI state ID of 6 bits.

The BS may configure the UE with one or a plurality of TCI states for a specific CORESET, and activate one of the configured TCI states through a MAC CE activation command. For example, TCI state #0, TCI state #1, and TCI state #2 may be configured as TCI states for CORESET #1, the BS may transmit, to the UE, a command for activating TCI state #0 assumed as a TCI state for CORESET #1 via the MAC CE. The UE may correctly receive a DMRS of the corresponding CORESET based on QCL information in the TCI state activated by the activation command for a TCI state received via the MAC CE.

In a case that the UE does not receive, for a CORESET (CORESET #0) with an index set to 0, a MAC CE activation command for activating a TCI state of CORESET #0, the UE may assume that a DMRS transmitted in CORESET #0 is QCLed with an SS/PBCH block identified during an initial access procedure or a non-contention-based random access procedure that is not triggered by a PDCCH order.

In a case that for a CORESET (CORESET #X) with an index set to a value other than 0, the UE is not configured with a TCI state for CORESET #X or configured with one or more TCI states but does not receive a MAC CE activation command for activating one of the TCI states, the UE

TABLE 9

```
TCI-State ::=                          SEQUENCE {
   tci-StateId                            TCI-StateId,
   (TCI state ID)
   qcl-Type1                              QCL-Info,
   (QCL information of first reference RS for RS (target RS) containing reference to
TCI state ID)
   qcl-Type2                              QCL-Info
                       OPTIONAL, -- Need R
   (QCL information of second reference RS for RS (target RS) containing reference
to TCI state ID)
   ...
}
QCL-Info ::=                            SEQUENCE {
   cell                                   ServCellIndex
       OPTIONAL,         -- Need R
   (serving cell index of reference RS indicated by QCL information)
   bwp-Id                                 BWP-Id
                       OPTIONAL, -- Cond CSI-RS-Indicated
   (BWP index of reference RS indicated by QCL information)
   referenceSignal                        CHOICE {
       csi-rs                             NZP-CSI-
RS-ResourceId,
       ssb                                SSB-Index
       (one of CSI-RS ID and SS/PBCH block ID indicated by QCL information)
   },
   qcl-Type                               ENUMERATED
{typeA, typeB, typeC, typeD},
   (QCL type indicated by QCL information)
   ...
}
``` may assume that a DMRS transmitted in CORESET #X is QCLed with an SS/PBCH block identified during an initial access procedure.

Hereinafter, a method of configuring a QCL relationship of the NR PDCCH when the DSS cell and the 5G cell are aggregated together using CA and the 5G cell performs cross-carrier scheduling for the DSS cell, which is the key feature of the second embodiment, is described. According to the first embodiment, the CSS for the PCell and the USS for the PCell may exist separately on the PCell and the SCell (i.e., the NR PDCCH search space configuration methods 1 and 3), a difference in QCL characteristics may also occur between the PCell and the SCell due to factors such as a frequency difference therebetween. Thus, it is necessary to independently operate QCL configuration for the CSS and QCL configuration for the USS.

NR PDCCH QCL Configuration Method 1 (Independent QCL Configurations for CSS and USS):

The NR PDCCH QCL configuration method 1 may operate independent QCL configurations for the CSS and the USS. Accordingly, the BS may inform the UE of QCL configuration information of the CSS and QCL configuration information of the USS via signaling. Alternatively, the BS may separately inform, via signaling, the UE of QCL configuration information of a CORESET in which the CSS is defined and QCL configuration information of a CORESET in which the USS is defined.

NR PDCCH QCL Configuration Method 2:

In a case that the UE does not receive a MAC CE activation command for a TCI state of the NR PDCCH for a certain cell, QCLs referenced for QCL of the NR PDCCH assumed by the UE as default are limited to available QCLs in the corresponding cell on which the NR PDCCH is transmitted. For example, when the UE monitors, on the SCell, NR PDCCH for scheduling an NR PDSCH on the PCell, if the UE does not receive a MAC CE activation command for activating a TCI state of a CORESET to which the NR PDCCH is mapped, the UE may assume a QCL of the NR PDCCH most recently recognized in the SCell for a DMRS transmitted in the CORESET. That is, unlike in the existing 5G system, the UE may not determine that the DMRS is QCLed with an SS/PBCH block on the PCell identified by the UE during an initial access procedure.

Third Embodiment

The third embodiment presents a procedure for configuring 5G CA between a DSS cell and a 5G cell and cross-carrier scheduling from the 5G cell to the DSS cell. Hereinafter, an operation of configuring CA for the UE is described with reference to FIG. 21.

Figure 21:
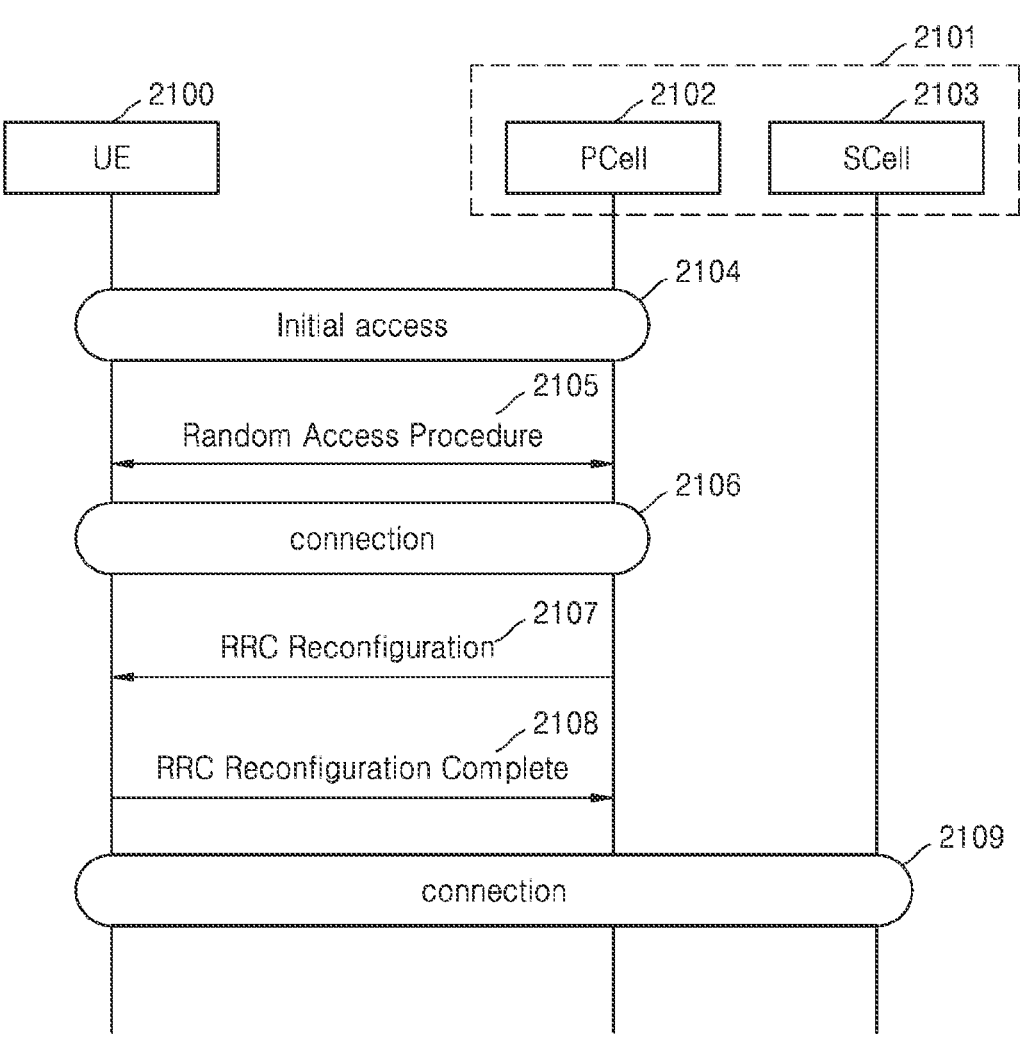
FIG. 21 illustrates a procedure for configuring CA in a wireless communication system, according to an embodiment of the present disclosure.

FIG. 21 illustrates a procedure for configuring CA in a wireless communication system, according to an embodiment of the present disclosure.

Referring to FIG. 21, in operation 2104, the UE 2100 performs initial access to the BS 2101. During the initial access procedure, the UE may perform cell search to attain DL time and frequency synchronization with a cell and obtain a cell identity (ID) from a synchronization signal transmitted by the BS. The UE may then use the obtained cell ID to receive a PBCH, and obtain a MIB that is essential system information from the PBCH. In addition, the UE may receive system information (a SIB) transmitted by the BS to obtain cell-common transmission/reception related control information. The cell-common transmission/reception related control information may include random access related control information, paging related control information, common control information regarding various physical channels, etc. The cell accessed by the UE in operation 2104 may be a PCell.

In operation 2105, the UE performs random access to the BS by using the random access related control information obtained from the system information. The UE that has successfully completed the random access procedure may attain UL time frequency with the BS. Then, the UE may transition to a connected state so that one-to-one communication between the BS and the UE is enabled.

In operation 2106, the UE performs data transmission and reception to and from the BS through the PCell. The UE may report UE capability information to the BS to inform the BS of whether the UE itself supports a certain functionality, a maximum allowable value of the functionality supported by the UE, etc. The UE capability information may include whether the UE supports CA and CA related information. In operation 2106, the UE may perform measurement report for neighboring cells. For example, if a received signal strength from a neighboring cell observed by the UE is greater than a preset threshold, the UE may transmit, to the BS, a measurement report including an ID and the received signal strength of the corresponding cell. A reference signal observed by the UE for the measurement report may be an SS/PBCH block or CSI-RS transmitted by a neighboring cell. The BS may inform the UE of control information for UE measurement report through signaling. The control information for the UE measurement report may include at least some of pieces of control information related to the following.

Information about a reference signal of a neighboring cell to be measured, such as whether the reference signal is an SS/PBCH block or CSI-RS Subcarrier spacing of the reference signal Location of the reference signal in the time/frequency domain Size of the reference signal in the time/frequency domain When reporting results of measurements performed by the UE to the BS, whether to report periodically or based on a predetermined event The BS may determine, based on the measurement report from the BS, whether to configure CA for the UE or to indicate handover to another cell. The determination as to whether to configure CA may mean determining whether to combine, for example, an additional carrier (SCell) with a PCell for the current UE. If the BS determines to configure CA for the UE, in operation 2107, the BS may transmit, to the UE, an "RRC reconfiguration" message including related information necessary for SCell combination at the UE. The related information necessary for the CA may include carrier bandwidth and center frequency information of the SCell, common control information on physical channels for the SCell, etc.

After completing a process for performing communication with the SCell according to the received 'RRC reconfiguration' message, in operation 2108, the UE transmits an 'RRC reconfiguration complete' message to the BS in operation 2108. From operation 2109, the UE is completely ready for data transmission and reception from and to both the PCell and the SCell of the BS.

Table 10 below shows various stages such as UE initial access and configuring and releasing CA.

TABLE 10

| Case | Description |
|------|-------------|
| Case 1 | Initial access, single cell operation |
| Case 2 | SCell addition |
| Case 3 | SCell activation |
| Case 4 | SCell deactivation |
| Case 5 | SCell release |
| Case 6 | Handover |

Case 1: Case 1 corresponds to a stage between initial access by the UE and performing CA, and the UE supports only a self-carrier scheduling operation. Therefore, the UE determines scheduling for the PCell by monitoring NR PDCCH transmitted on the PCell.

Case 2: Case 2 corresponds to an SCell addition stage in which the BS instructs the UE to perform CA by adding a certain SCell. The BS configures SCell addition for the UE via RRC signaling. The RRC signaling for SCell addition includes cross-carrier scheduling configuration information listed in Table 11 below. RRC signaling for SCell addition is included in the 'RRC reconfiguration' message described with reference to FIG. 21.

TABLE 11

```
CrossCarrierSchedulingConfig ::=          SEQUENCE {
    schedulingCellInfo                    CHOICE {
        own                               SEQUENCE {        -- Cross carrier scheduling:
scheduling cell
            cif-Presence                      BOOLEAN
                                          (indication of presence of carrier indicator field (CIF) in DCI field)
    },
        other                             SEQUENCE {        -- Cross carrier scheduling:
scheduled cell
            schedulingCellId                  ServCellIndex,
                                          (cell index of scheduling cell (cell on which NR PDCCH is
transmitted in case of cross-carrier scheduling))
            cif-InSchedulingCell              INTEGER (1..7)
                                          (CIF in scheduling cell)
        }
    },
    ...
}
```

The BS may inform the UE of whether the PCell is cross-carrier scheduled by the SCell by adding the following signaling to the cross-carrier scheduling configuration information.

1) Signaling 1: indicating a PCell ID as index information ("scheduledCellId") of a scheduled cell on which an NR PDSCH/NR PUSCH scheduled by an NR PDCCH are transmitted, or 2) Signaling 2: explicitly indicating that the PCell is by the SCell Table 12 shows a specific example of cross carrier scheduling configuration information including signaling 1 or signaling 2 described above. "PcellCrossCarrierScheduling" specified in Table 12 below may indicate whether the PCell is cross-carrier scheduled by the SCell ("enabled") or whether the PCell is not cross-carrier scheduled by the SCell ("disabled"). "cif-InSchedulingCell" information in "PcellCrossCarrierScheduling" may indicate a carrier indicator field (CIF) value to be included in DCI and used when the SCell performs cross-carrier scheduling for the PCell.

TABLE 12

```
CrossCarrierSchedulingConfig ::=          SEQUENCE {
    schedulingCellInfo                    CHOICE {
        own                                   SEQUENCE {        -- Cross
carrier scheduling: scheduling cell
            cif-Presence                          BOOLEAN
            (indication of presence of carrier indicator field (CIF) in DCI field)
        },
        other                                 SEQUENCE {        -- Cross
carrier scheduling: scheduled cell
            schedulingCellId                      ServCellIndex,
            (cell index of scheduling cell (cell in which NR PDCCH is transmitted in
case of cross-carrier scheduling))
            cif-InSchedulingCell                  INTEGER (1..7)
            (CIF in scheduling cell)
        }
    },
```

TABLE 12-continued

```
FcellCrossCarrierScheduling        CHOICE {
    disabled                       NULL,
    enabled                        SEQUENCE {
        cif-InSchedulingCell               INTEGER (1..7)
},
...
}
```

Even when the BS configures that the PCell is cross-carrier scheduled by the SCell, before SCell activation, the UE determines scheduling for the PCell by monitoring the NR PDCCH transmitted on the PCell.

According to an embodiment, in Case 2 described above, whether the PCell is cross-carrier scheduled by the SCell is configured in the RRC signaling for SCell addition, but as a modified example of Case 2, a method of changing the existing configuration of the PCell may also be used. For example, the cross-carrier scheduling configuration information in Table 11 described above may be included in configuration information of the PCell, and in the SCell addition stage, whether the PCell is cross-carrier scheduled by the SCell may be updated.

Case 3: Case 3 corresponds to an SCell activation stage in which the BS indicates SCell activation to the UE that has completed SCell configuration through the SCell addition. When the SCell is activated, the UE monitors the NR PDCCH for scheduling the corresponding SCell, and performs operations such as SRS transmission, CSI reporting, and PUCCH transmission on an SCell UL. The BS may inform the UE of SCell activation via MAC signaling or physical layer signaling.

The BS may include whether the PCell is cross-carrier scheduled by the SCell in the SCell activation signaling, if the BS has already notified, in the SCell addition stage, the UE of whether the PCell is cross-carrier scheduled by the SCell, control information indicating whether the PCell is cross-carrier scheduled by the SCell may be omitted from the SCell activation signaling.

When the BS configures that the PCell is cross-carrier scheduled by the SCell and indicates the SCell activation, the UE determines scheduling for the PCell by monitoring an NR PDCCH transmitted on the SCell (the NR PDCCH search space configuration method 2) or by monitoring NR PDCCHs respectively transmitted on the PCell and the SCell (the NR PDCCH search space configuration methods 1 and 3).

Case 4: Case 4 corresponds to an SCell deactivation stage in which the currently activated SCell is changed to a deactivation state. When the SCell is deactivated, the UE does not monitor the NR PDCCH for scheduling the corresponding SCell and not perform operations such as SRS transmission, CSI reporting, and PUCCH transmission in the SCell UL. The BS may inform the UE of the SCell deactivation via MAC signaling or physical layer signaling.

If the BS has configured that the PCell is cross-carrier scheduled by the SCell, according to the SCell deactivation, the UE determines scheduling for the PCell by monitoring an NR PDCCH transmitted on the PCell.

Case 5: Case 5 corresponds to an SCell release stage in which the BS instructs the UE to release the current SCell from a CA operation. The BS configures SCell release for the UE via RRC signaling. Similar to the SCell deactivation operation, the UE determines scheduling for the PCell by monitoring the NR PDCCH transmitted from the PCell.

Case 6: It corresponds to a handover stage that changes the serving cell of the UE, in which the BS may indicate to the UE whether to configure CA after handover, whether to configure cross-carrier scheduling, and whether the SCell is to perform cross-carrier scheduling for the PCell by including them in a handover command.

As a modified example of Case 2 and Case 3, the following operations may be performed. When the BS notifies the UE that the SCell performs cross-carrier scheduling for the PCell in the SCell addition stage, the UE may determine scheduling for the PCell even without an additional SCell activation command by monitoring the NR PDCCH transmitted on the SCell (the NR PDCCH search space configuration method 2) or by monitoring the NR PDCCHs respectively transmitted on the PCell and the SCell (the NR PDCCH search space configuration methods 1 and 3). On the other hand, in the case of NR PDCCH monitoring for scheduling the SCell, the UE may perform the monitoring in the corresponding SCell after SCell activation but not before the SCell activation.

Fourth Embodiment

In the procedure for configuring 5G CA between a DSS cell and a 5G cell and cross-carrier scheduling from the 5G cell to the DSS cell, the fourth embodiment describes a specific method, performed by the UE, of monitoring NR PDCCH upon the SCell activation (Case 3) and the SCell deactivation (Case 4).

Hereinafter, an SCell activation operation and an SCell deactivation operation are described with reference to FIGS. 25 and 26, respectively.

As described above, the BS may instruct the UE to perform CA by adding a certain Scell (SCell addition). In addition, the BS may inform the UE of whether the PCell is cross-carrier scheduled by the SCell. In the example of FIG. 25, it may be assumed that the BS configures the UE so that the PCell is cross-carrier scheduled by the SCell through an SCell addition operation. Also, in the example of FIG. 25, use of the NR PDCCH search space configuration method 1 may be assumed.

Figure 25:
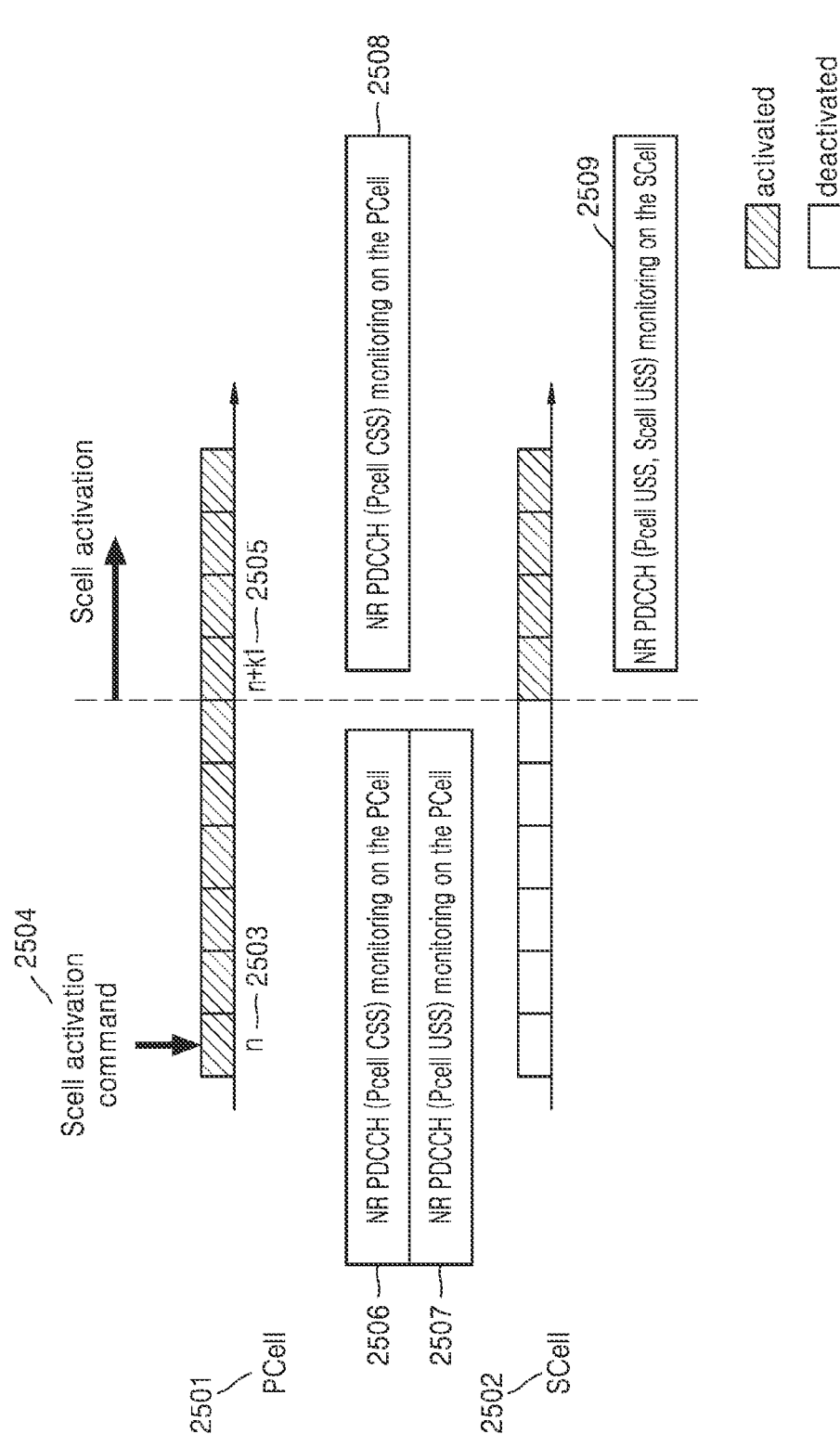
FIG. 25 is a diagram illustrating an NR PDCCH monitoring operation of a UE according to a secondary cell (SCell) activation command in a wireless communication system, according to an embodiment of the present disclosure.

Referring to FIG. 25, an activation state of the SCell according to an SCell activation command 2504 and on which cell of a PCell 2501 or an SCell 2502 the UE should monitor a search space for an NR PDCCH are described. In the example of FIG. 25, the UE may receive the SCell activation command 2504 from the BS in slot n 2503. The UE may complete the SCell activation in slot n±k1 2505 that is after a lapse of certain processing time k1 for processing the SCell activation command. Therefore, until slot n+k1, i.e., before completion of the SCell activation, the UE may monitor a CSS and a USS of the PCell on the PCell in order to obtain an NR PDCCH scheduling the PCell (2506 and 2507). Then, after slot n+k1 in which the SCell activation is completed, the UE may monitor the CSS of the PCell on the PCell (2508) and the USS of the PCell on the SCell (2509) in order to obtain an NR PDCCH scheduling the PCell. In addition, the UE may monitor a USS of the SCell on the SCell to obtain an NR PDCCH scheduling the SCell (2509).

The example of FIG. 25 may be modified with various operations. For example, if use of the NR PDCCH search space configuration method 3 is assumed, the UE may monitor the USS of the PCell on the PCell even after slot n+k1 in which the SCell activation is completed. In other words, after slot n+k1, the UE may monitor the USS of the PCell both in the PCell and the SCell.

In the example of FIG. 25, according to the NR PDCCH search space configuration methods 1 and 3, the UE may monitor the CSS of the PCell on the PCell regardless of whether the SCell is activated.

Hereinafter, referring to FIG. 26, a deactivation state of the SCell according to an SCell deactivation command 2604 and on which cell of a PCell 2601 or an SCell 2602 the UE should monitor a search space for an NR PDCCH are described.

Figure 26:
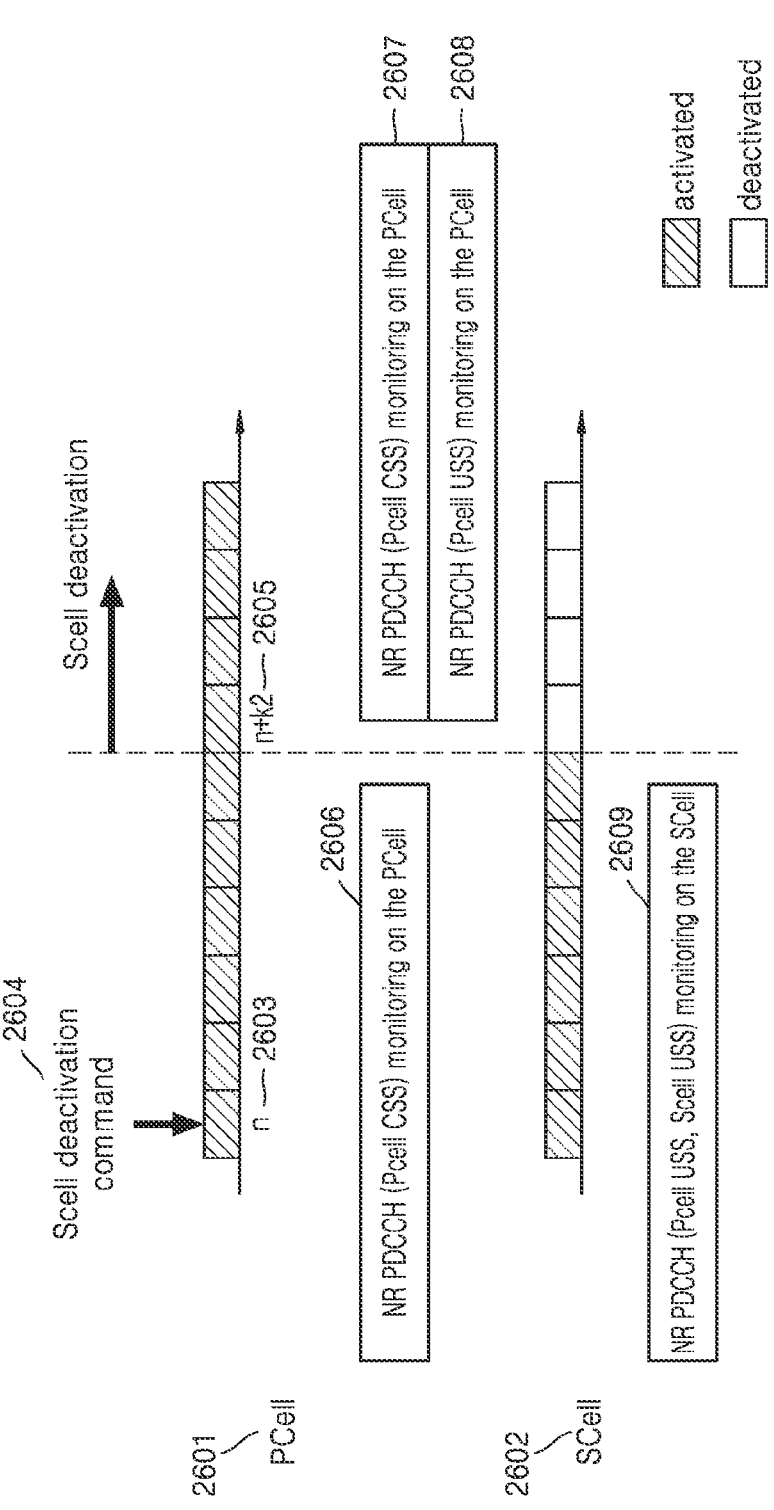
FIG. 26 is a diagram illustrating an NR PDCCH monitoring operation of a UE according to an SCell deactivation command in a wireless communication system, according to an embodiment of the present disclosure.

In the example of FIG. 26, it may be assumed that the BS configures the UE so that the PCell is cross-carrier scheduled by the SCell through an SCell addition operation and an SCell activation command. Also, use of the NR PDCCH search space configuration method 1 may be assumed.

In the example of FIG. 26, the UE may receive an SCell deactivation command 2604 from the BS in slot n 2603. The UE may complete SCell deactivation in slot n+k2 2605 that is after a lapse of certain processing time k2 for processing the SCell deactivation command. Therefore, until slot n+k2, i.e., before completion of the SCell deactivation, the UE may monitor a CSS of the PCell on the PCell in order to obtain an NR PDCCH scheduling the PCell (2606). Also, until slot n+k2, the UE may monitor a USS of the PCell on the SCell in order to obtain the NR PDCCH scheduling the PCell and a USS of the SCell on the SCell in order to obtain an NR PDDCH scheduling the SCell (2609). Then, after slot n+k2 in which the SCell deactivation is completed, the UE may monitor the CSS of the PCell on the PCell (2607) and the USS of the PCell on the PCell (2608) in order to obtain the NR PDCCH scheduling the PCell. Also, the UE may no longer monitor an NR PDCCH for scheduling the SCell.

The example of FIG. 26 may be modified with various operations. For example, if use of the NR PDCCH search space configuration method 3 is assumed, the UE may monitor the USS of the PCell both on the PCell and the SCell before slot n+k2, i.e., before completion of the SCell deactivation.

In the example of FIG. 26, according to both the NR PDCCH search space configuration methods 1 and 3, the UE may monitor the CSS of the PCell on the PCell regardless of whether the SCell is deactivated.

Figure 22:
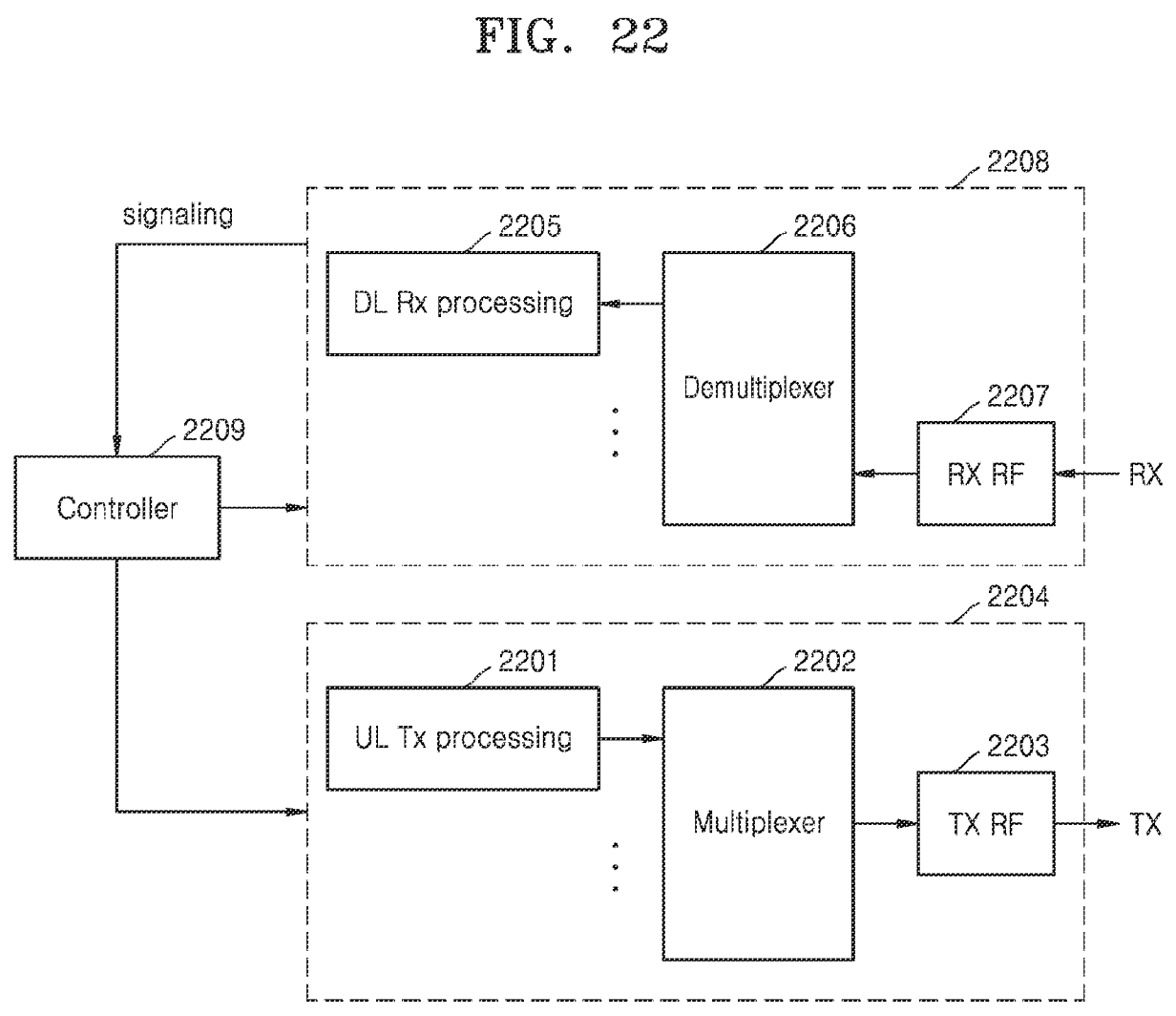

FIG. 22 is a diagram illustrating a transmitter and a receiver of a UE in a wireless communication system, according to an embodiment of the present disclosure. Devices not directly related to the present disclosure are not illustrated or described for convenience of descriptions.

Referring to FIG. 22, the UE may include a transmitter 2204 including a UL transmission (TX) processing block 2201, a multiplexer 2202, and a TX radio frequency (RF) block 2203, a receiver 2208 including a DL reception (RX) processing block 2205, a demultiplexer 2206, an RX RF block 2207, and a controller 2209. The controller 2209 may control the blocks of the receiver 2208 for receiving a data channel or a control channel transmitted by a BS as described above and the blocks of the transmitter 2204 for transmitting a UL signal.

The UL TX processing block 2201 in the transmitter 2204 of the UE may generate a signal to be transmitted by performing processes such as channel coding, modulation, etc. The signal generated by the UL TX processing block 2201 may be multiplexed with other UL signals by the multiplexer 2202, undergo signal processing by the TX RF block 2203, and then be transmitted to the BS.

The receiver 2208 of the UE may demultiplex a signal received from the BS and distribute the resulting signals to respective DL RX processing blocks. The DL RX processing block 2205 may obtain control information or data transmitted by the BS by performing processes such as demodulation, channel decoding, etc., on a DL signal from the BS. The receiver 2208 of the UE may support operation of the controller 2209 by providing an output of the DL RX processing block to the controller 2209.

Figure 23:
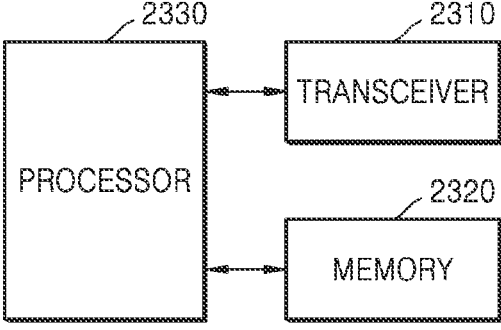
FIG. 23 is a block diagram of a configuration of a UE according to an embodiment of the present disclosure.

FIG. 23 is a block diagram of a configuration of a UE according to an embodiment of the present disclosure.

Referring to FIG. 23, the UE may include a processor 2330, a transceiver 2310, and a memory 2320. However, the components of the UE are not limited to the above-described example. For example, the UE may include more or fewer components than those described above. Furthermore, the processor 2330, the transceiver 2310, and the memory 2320 may be implemented as a single chip. According to an embodiment, the transceiver 2310 may include the transmitter 2204 and the receiver 2208 of FIG. 22. In addition, the processor 2330 of FIG. 23 may include the controller 2209 of FIG. 22.

According to an embodiment, the processor 2330 may control a series of processes such that the UE may operate according to an embodiment of the present disclosure. For example, the processor 2330 may control the components of the UE so that the UE performs transmission and reception methods in a wireless communication system to which CA is applied, according to an embodiment of the present disclosure. The processor 2330 may include a plurality of processors, and perform the UE transmission and reception methods in the wireless communication system to which CA is applied, according to the present disclosure, by executing programs stored in the memory 2320.

The transceiver 2310 may transmit or receive signals to or from the BS. The signals transmitted or received to or from the BS may include control information and data. The transceiver 2310 may include an RF transmitter for up-converting and amplifying a frequency of a signal to be transmitted and an RF receiver for low-noise amplifying a received signal and down-converting its frequency. However, this is merely an example of the transceiver 2310, and components of the transceiver 2310 are not limited to the RF transmitter and the RF receiver. Furthermore, the transceiver 2310 may receive a signal via a radio channel and output the signal to the processor 2330 and transmit a signal output from the processor 2330 via a radio channel.

According to an embodiment, the memory 2320 may store data and programs necessary for operations of the UE. Furthermore, the memory 2320 may store control information or data included in a signal transmitted or received by the UE. The memory 2320 may be composed of storage media, such as read-only memory (ROM), random access memory (RAM), hard discs, compact disc (CD)-ROM, and digital versatile discs (DVDs), or a combination thereof. In addition, the memory 2320 may be configured as a plurality of memories. According to an embodiment, the memory

2320 may store a program for performing transmission and reception operations of the UE in a wireless communication system to which CA is applied, according to the embodiments of the present disclosure.

Figure 24:
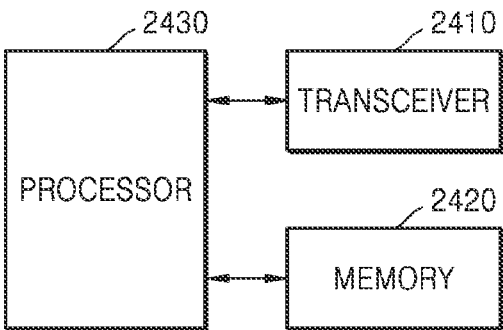
FIG. 24 is a block diagram of a configuration of a base station according to an embodiment of the present disclosure.

FIG. 24 is a block diagram of a configuration of a BS according to an embodiment of the present disclosure.

Referring to FIG. 24, the BS may include a transceiver 2410, a memory 2420, and a processor 2430. However, the components of the BS are not limited to the above-described example. For example, the BS may include more or fewer components than those described above. Furthermore, the transceiver 2410, the memory 2420, and the processor 2430 may be implemented as a single chip.

According to an embodiment, the processor 2430 may control a series of processes such that the BS may operate according to the embodiments of the present disclosure. For example, the processor 2430 may control the components of the BS to perform a method of scheduling the UE in a mobile communication system to which CA is applied, according to an embodiment of the present disclosure. The processor 2430 may include a plurality of processors, and perform the method of scheduling the UE in the mobile communication system to which CA is applied, according to the present disclosure, by executing programs stored in the memory 2420.

The transceiver 2410 may transmit or receive signals to or from the UE. The signals transmitted or received to or from the UE may include control information and data. The transceiver 2410 may include an RF transmitter for up-converting and amplifying a frequency of a signal to be transmitted and an RF receiver for low-noise amplifying a received signal and down-converting its frequency. However, this is merely an example of the transceiver 2410, and components of the transceiver 2410 are not limited to the RF transmitter and the RF receiver. Furthermore, the transceiver 2410 may receive a signal via a radio channel and output the signal to the processor 2430 and transmit a signal output from the processor 2430 via a radio channel.

According to an embodiment, the memory 2420 may store data and programs necessary for operations of the BS. Furthermore, the memory 2420 may store control information or data included in a signal transmitted or received by the BS. The memory 2420 may be composed of storage media, such as ROM, RAM, hard discs, CD-ROM, and DVDs, or a combination thereof. The memory 2420 may also be configured as a plurality of memories. According to an embodiment, the memory 2420 may store a program for performing the method of scheduling the UE in the mobile communication system to which CA is applied, according to the embodiments of the present disclosure.

According to an embodiment of the present disclosure, an operation method of a UE in a wireless communication system may include receiving, from a BS, configuration information related to CA wherein the configuration information related to the CA includes information related to cross-carrier scheduling between a PCell and an SCell, performing configuration related to the CA, based on the configuration information related to the CA, and monitoring a CSS of the PCell on the PCell and monitoring a USS of the SCell on the SCell, based on the performed configuration related to the CA, and receiving a PDCCH, based on the monitoring.

According to an embodiment, the operation method of the UE may further include monitoring a USS of the PCell on the PCell, based on the performed configuration related to the CA.

According to an embodiment, a search space configuration for the USS of the PCell monitored on the SCell is determined based on a search space configuration for the USS of the SCell monitored on the SCell, and a CORESET configuration for the USS of the PCell monitored on the SCell is determined based on a CORESET configuration for the USS of the SCell monitored on the SCell.

According to an embodiment, the operation method of the UE may further include receiving, via radio resource signal (RRC) signaling, from the BS, information related to a search space configuration for the USS of the PCell monitored on the SCell and information related to a CORESET configuration for the USS of the PCell.

According to an embodiment, the information related to the cross-carrier scheduling between the PCell and the SCell may include an indicator indicating whether the PCell is cross-carrier scheduled by the SCell, and when the PCell is cross-carrier scheduled by the SCell, the information related to the cross-carrier scheduling between the PCell and the SCell may include a carrier indicator field (CIF) value.

According to an embodiment, when the indicator indicates that the PCell is cross-carrier scheduled by the SCell, the operation method of the UE may further include receiving, from the BS, a command message related to SCell activation, monitoring the CSS of the PCell and the USS of the PCell on the PCell from a slot in which the command message related to the SCell activation is received to a slot in which the SCell activation is completed, and until a predetermined slot after the slot in which the SCell activation is completed, monitoring the CSS of the PCell on the PCell and monitoring at least one of the USS of the PCell or the USS of the SCell on the SCell.

According to an embodiment, when the indicator indicates that the PCell is cross-carrier scheduled by the SCell, the operation method of the UE may further include receiving, from the BS, a command message related to SCell deactivation, from a slot in which the command message related to the SCell deactivation is received to a slot in which the SCell deactivation is completed, monitoring the CSS of the PCell on the PCell and monitoring the USS of the PCell and the USS of the SCell on the SCell, and monitoring the CSS of the PCell and the USS of the PCell on the PCell until a predetermined slot after the slot in which the SCell deactivation is completed.

According to an embodiment, the operation method of the UE may further include, when the information related to the cross-carrier scheduling between the PCell and the SCell does not include the indicator indicating whether the PCell is cross-carrier scheduled by the SCell, receiving, from the BS, an SCell activation message including information about whether the PCell is cross-carrier scheduled by the SCell.

According to an embodiment of the present disclosure, a UE in a wireless communication system may include a transceiver, and at least one processor configured to receive, via the transceiver, configuration information related to CA from a BS, wherein the configuration information related to the CA including information related to cross-carrier scheduling between a PCell and an SCell, perform configuration related to the CA, based on the configuration information related to the CA, monitor a CSS of the PCell on the PCell and monitor a USS of the SCell on the SCell, based on the performed configuration related to the CA, and receive, via the transceiver, a PDCCH, based on the monitoring.

According to an embodiment, the at least one processor may monitor a USS of the PCell on the PCell, based on the performed configuration related to the CA.

According to an embodiment, a search space configuration for the USS of the PCell monitored on the SCell may be determined based on a search space configuration for the USS of the SCell monitored on the SCell, and a CORESET configuration for the USS of the PCell monitored on the SCell may be determined based on a CORESET configuration for the USS of the SCell monitored on the SCell.

According to an embodiment, the information related to the cross-carrier scheduling between the PCell and the SCell may include an indicator indicating whether the PCell is cross-carrier scheduled by the SCell, and when the PCell is cross-carrier scheduled by the SCell, the information related to the cross-carrier scheduling between the PCell and the SCell may include a CIF value.

According to an embodiment, when the indicator indicates that the PCell is cross-carrier scheduled by the SCell, the at least one processor may receive, via the transceiver, a command message related to SCell activation from the BS, monitor the CSS of the PCell and the USS of the PCell on the PCell from a slot in which the command message related to the SCell activation is received to a slot in which the SCell activation is completed, and until a predetermined slot after the slot in which the SCell activation is completed, monitor the CSS of the PCell on the PCell and monitor at least one of the USS of the PCell or the USS of the SCell on the SCell.

According to an embodiment, when the indicator indicates that the PCell is cross-carrier scheduled by the SCell, the at least one processor may receive, via the transceiver, a command message related to SCell deactivation from the BS, monitor the CSS of the PCell on the PCell and monitor the USS of the PCell and the USS of the SCell on the SCell, from a slot in which the command message related to the SCell deactivation is received to a slot in which the SCell deactivation is completed, and monitor the CSS of the PCell and the USS of the PCell on the PCell until a predetermined slot after the slot in which the SCell deactivation is completed.

According to an embodiment, when the information related to the cross-carrier scheduling between the PCell and the SCell does not include the indicator indicating whether the PCell is cross-carrier scheduled by the SCell, the at least one processor may receive, via the transceiver, from the BS, an SCell activation message including information about whether the PCell is cross-carrier scheduled by the SCell.

The methods according to the embodiments of the present disclosure described in the appended claims or specification thereof may be implemented in hardware, software, or a combination of hardware and software.

When the methods are implemented in software, a computer-readable storage medium or a computer program product having at least one program (software module) stored therein may be provided. The at least one program stored in the computer-readable storage medium or the computer program product is configured for execution by at least one processor within an electronic device. The at least one program includes instructions that cause the electronic device to execute the methods according to the embodiments of the present disclosure described in the claims or specification thereof.

The program (software module or software) may be stored in RAM, non-volatile memory including a flash memory, ROM, electrically erasable programmable ROM (EEPROM), magnetic disc storage devices, CD-ROM, DVDs or other types of optical storage devices, and magnetic cassettes. Alternatively, the program may be stored in a memory that is configured as a combination of some or all of the stated devices. A plurality of such devices may be included in the memory.

Furthermore, the program may be stored in an attachable storage device that may be accessed through communication networks, such as the Internet, Intranet, a local area network (LAN), a wide LAN (WLAN), and a storage area network (SAN), or a communication network configured in a combination thereof. The storage device may connect to a device for implementing an embodiment of the present disclosure via an external port. Furthermore, a separate storage device on a communication network may also connect to a device for implementing the embodiment of the present disclosure.

In the present disclosure, the term "computer program product" or "computer-readable medium" is used to collectively refer to a medium such as a memory, a hard disk installed in a hard disk drive, a signal, or the like. The "computer program product" or "computer-readable medium" is a means for providing the transmission and reception methods by the UE in a wireless communication system to which CA is applied, according to the present disclosure.

In the specific embodiments of the present disclosure, a component included in the present disclosure is expressed in a singular or plural form depending on the presented specific embodiments. However, singular or plural expressions are selected to be suitable for situations presented for convenience of description, and the present disclosure is not limited to elements in a singular or plural form, i.e., an element expressed in a plural form may be configured as a single element, or an element expressed in a singular form may be configured as a plurality of elements.

Moreover, while the embodiments of the present disclosure are disclosed in the present specification and the accompanying drawings and particular terms have been used, they are provided only in a general sense to easily describe the technical idea of the present disclosure and assist in understanding the present disclosure and are not intended to limit the scope of the present disclosure. For example, although the present disclosure is based on a scenario in which different systems such as LTE and 5G are combined, it may be generalized and applied to CA within the same system (e.g., 5G). Alternatively, the present disclosure may be applied to a scenario in which 5G is combined with a 6G system to be launched in the future. It is obvious to those of ordinary skill in the art that other modifications based on the technical spirit of the present disclosure are implementable in addition to the embodiments disclosed herein. Furthermore, the embodiments may be combined with each other for operation when necessary.

Moreover, although specific embodiments have been described in the detailed description of the present disclosure, various modifications may be made therein without departing from the scope of the present disclosure. Therefore, the scope of the present disclosure should not be limited to the described embodiments but be defined by the following claims as well as their equivalents.

The invention claimed is:

1. A method performed by a user equipment (UE) in a wireless communication system, the method comprising:

receiving, from a base station, a radio resource control (RRC) message including configuration information associated with a cross carrier scheduling;

identifying whether information indicating that a primary cell (PCell) is scheduled by a secondary cell (SCell) is configured in the configuration information; and in case that the information indicating that the PCell is scheduled by the SCell is configured, monitoring a physical downlink control channel (PDCCH) on the SCell and the PCell, wherein the PDCCH schedules at least one of the PCell's physical downlink shared channel (PDSCH) or the PCell's physical uplink shared channel (PUSCH), and wherein the PDCCH on the SCell is monitored in at least one UE-specific search space (USS) configured on the SCell for the cross carrier scheduling from the SCell to the PCell.

2. The method of claim 1, wherein the information indicating that the PCell is scheduled by the SCell includes a scheduling cell identifier (ID) corresponding to the SCell and a carrier indicator field (CIF) value corresponding to the PCell.

3. The method of claim 1, further comprising:
in case that the SCell is deactivated, stopping the monitoring of the PDCCH on the SCell.

4. The method of claim 1, further comprising:
in case that the SCell is deactivated, stopping a physical uplink control channel (PUCCH) transmission.

5. The method of claim 1, wherein the configuration information associated with cross carrier scheduling is included in configuration information for the PCell.

6. A user equipment (UE) in a wireless communication system, comprises:
a transceiver; and
at least one processor coupled with the transceiver and configured to:
receive, from a base station, a radio resource control (RRC) message including configuration information associated with a cross carrier scheduling;
identify whether information indicating that a primary cell (PCell) is scheduled by a secondary cell (SCell) is configured in the configuration information; and
in case that the information indicating that the PCell is scheduled by the SCell is configured, monitor a physical downlink control channel (PDCCH) on the SCell and the PCell,
wherein the PDCCH schedules at least one of the PCell's physical downlink shared channel (PDSCH) or the PCell's physical uplink shared channel (PUSCH), and
wherein the PDCCH on the SCell is monitored in at least one UE-specific search space (USS) configured on the SCell for the cross carrier scheduling from the SCell to the PCell.

7. The UE of claim 6, wherein the information indicating that the PCell is scheduled by the SCell includes a scheduling Cell identifier (ID) corresponding to the SCell and a carrier indicator field (CIF) value corresponding to the PCell.

8. The UE of claim 6, wherein the processor is further configured to:
in case that the SCell is deactivated, stop the monitoring of the PDCCH on the SCell.

9. The UE of claim 6, wherein the processor is further configured to:
in case that the SCell is deactivated, stop a physical uplink control channel (PUCCH) transmission.

10. The UE of claim 6, wherein the configuration information associated with cross carrier scheduling is included in configuration information for the PCell.

11. A method performed by a base station in a wireless communication system, the method comprising:
transmitting, to a user equipment (UE), a radio resource control (RRC) message including configuration information associated with a cross carrier scheduling, wherein the configuration information indicating that a primary cell (PCell) is scheduled by a secondary cell (SCell); and
transmitting, to the UE, a physical downlink control channel (PDCCH) on the SCell and the PCell,
wherein the PDCCH schedules at least one of the PCell's physical downlink shared channel (PDSCH) or the PCell's physical uplink shared channel (PUSCH), and
wherein the PDCCH on the SCell is monitored in at least one UE-specific search space (USS) configured on the SCell for the cross carrier scheduling from the SCell to the PCell.

12. The method of claim 11, wherein the information indicating that the PCell is scheduled by the SCell includes a scheduling Cell identifier (ID) corresponding to the SCell and a carrier indicator field (CIF) value corresponding to the PCell.

13. A base station in a wireless communication system, comprising:
a transceiver;
at least one processor coupled with the transceiver and configured to:
transmit, to a user equipment (UE), a radio resource control (RRC) message including configuration information associated with a cross carrier scheduling, wherein the configuration information indicating that a primary cell (PCell) is scheduled by a secondary cell (SCell); and
transmit, to the UE, a physical downlink control channel (PDCCH) on the SCell and the PCell,
wherein the PDCCH schedules at least one of the PCell's physical downlink shared channel (PDSCH) or the PCell's physical uplink shared channel (PUSCH), and
wherein the PDCCH on the SCell is monitored in at least one UE-specific search space (USS) configured on the SCell for the cross carrier scheduling from the SCell to the PCell.

* * * * *